United States Patent
Liu et al.

(10) Patent No.: US 11,409,001 B2
(45) Date of Patent: Aug. 9, 2022

(54) METHOD FOR TILT MEASUREMENT AND COMPENSATION OF SURVEYING INSTRUMENT BASED ON GNSS RECEIVER AND IMU SENSOR

(71) Applicants: Feyman (Beijing) Technology Co. Ltd, Beijing (CN); Feyman Technology (USA) Inc, Phoenix, AZ (US)

(72) Inventors: Junjie Liu, Beijing (CN); Qiang Li, Beijing (CN)

(73) Assignees: Feyman (Beijing) Technology Co. Ltd, Beijing (CN); Feyman Technology (USA) Inc, Phoenix, AZ (US)

( * ) Notice: Subject to any disclaimer, the term of this patent is extended or adjusted under 35 U.S.C. 154(b) by 523 days.

(21) Appl. No.: 16/556,926

(22) Filed: Aug. 30, 2019

(65) Prior Publication Data

US 2020/0333468 A1 Oct. 22, 2020

(30) Foreign Application Priority Data

Apr. 18, 2019 (CN) .......................... 201910315225.9

(51) Int. Cl.
- *G01S 19/03* (2010.01)
- *G01S 19/43* (2010.01)
- *G01C 15/06* (2006.01)

(52) U.S. Cl.
CPC .............. *G01S 19/03* (2013.01); *G01C 15/06* (2013.01); *G01S 19/43* (2013.01)

(58) Field of Classification Search
CPC .......... G01S 19/03; G01S 19/43; G01C 15/06

USPC ............... 702/95; 342/357.23, 357.28, 357.3
See application file for complete search history.

(56) References Cited

U.S. PATENT DOCUMENTS

| | | | | |
|---|---|---|---|---|
| 10,563,980 B2* | 2/2020 | Edelman | ............... | G01C 15/002 |
| 2017/0122736 A1* | 5/2017 | Dold | ...................... | G01S 17/89 |
| 2019/0234733 A1* | 8/2019 | Nishita | ................... | G01S 17/87 |

FOREIGN PATENT DOCUMENTS

| | | | | |
|---|---|---|---|---|
| CN | 215832732 U | * | 2/2022 | |
| WO | WO-2012049492 A1 | * | 4/2012 | ............. G01C 21/16 |

* cited by examiner

*Primary Examiner* — Harry K Liu
(74) *Attorney, Agent, or Firm* — Bayramoglu Law Offices LLC

(57) ABSTRACT

A method for tilt measurement and compensation of a GNSS RTK surveying instrument based on a GNSS receiver and an IMU sensor is proposed. Based on the algorithm principle of the Kalman filter, the prediction and the correction of the designed multi-dimensional unknown state variable are cycled for multiple times to make the multi-dimensional unknown state variable approach the true value as much as possible. Then, based on the multi-dimensional unknown state variable, the latest three-dimensional attitude angle from the XYZ coordinate system to the NED coordinate system and the latest rotation matrix can be obtained efficiently and accurately. Finally, the coordinate of the antenna phase center of the GNSS receiver is reduced to the coordinate of the bottom end of the pole by a geometric transformation. In addition, no factory calibration is needed as the self-calibration can always be done during the operation process.

10 Claims, 3 Drawing Sheets

11,409,001 B2

METHOD FOR TILT MEASUREMENT AND COMPENSATION OF SURVEYING INSTRUMENT BASED ON GNSS RECEIVER AND IMU SENSOR

CROSS REFERENCE TO THE RELATED APPLICATIONS

This application is based upon and claims priority to Chinese Patent Application No. 201910315225.9, filed on Apr. 18, 2019, the entire contents of which are incorporated herein by reference.

TECHNICAL FIELD

The present disclosure belongs to the technical field of surveying and mapping using Global Navigation Satellite System (GNSS) and real time kinematic (RTK) instrument, and particularly relates to a method for tilt measurement and compensation of a GNSS RTK surveying instrument based on a GNSS receiver and an IMU sensor.

BACKGROUND

In conventional RTK surveying, where the pole needs to be leveled with a level bubble by a surveyor, the latitude and longitude of the antenna phase center of the GNSS RTK surveying instrument are exactly the latitude and longitude of the target point to be surveyed at the bottom of the pole. The height of the target point can be obtained by simply subtracting the known distance between the bottom of the pole and the antenna phase center of the GNSS RTK surveying instrument from the height of the antenna phase center of the GNSS RTK surveying instrument. However, for precise measurement, the pole needs to be held in a vertical position by the surveyor for about half a minute. It is very difficult to always hold the pole vertical on the target point, and such a method reduces the productivity. In addition, in some cases, for example when measuring at corners of the building, limited by the volume of the GNSS (Global Navigation Satellite System, which is the standard generic term for satellite navigation systems that provide autonomous geo-spatial positioning with global coverage including global satellite navigation systems, regional satellite navigation systems, and satellite navigation augmentation systems, such as America's Global Positioning System (GPS), Russia's GLONASS, Europe's GALILEO, and China's BEIDOU Navigation Satellite System, and related augmentation systems, such as the America's Wide Area Augmentation System, Europe's European Geostationary Navigation Overlay Service, and Japan's Multi-Functional Transport Satellite Augmentation System, etc.) receiver, it is not possible to hold the pole vertically. Although the latest GNSS RTK surveying instrument is offering the function of tilt measurement and compensation, and the position of the bottom of the pole can be calculated with a tilt of less than 20 degrees over a few seconds, to achieve the tilt measurement, the real-time tilt angle and azimuth angle of the GNSS RTK surveying instrument are required, thus an angle measuring system should be provided.

Currently, an angle measuring system composed of an inclinometer and a magnetometer sensor is used to directly measure the attitude angle and the azimuth angle, respectively. However, this method has the following drawbacks: (1) the accuracy of the angle measured by the inclinometer is only acceptable in static measurement, and the accuracy of the measured tilt angle will be reduced due to the movements of the pole caused by wind or other external forces; (2) if a sudden magnetic disturbance is caused, for example, due to a passing by car, the measured azimuth angle will have a relatively large error with a notable fluctuation; (3) not knowing the condition of the magnetic environment may cause a large error on the magnetic calibration result, directly reducing the accuracy in the subsequent procedures; and (4) to be cost-effective, a low-cost sensor is usually employed, and the 100% reliability of the low-cost device cannot be guaranteed. To summarize, the existing tilt measuring method has low tilt angle accuracy and may cause large azimuth angle error.

Although some manufacturers (such as Shanghai Huace Navigation Technology Ltd.) are trying to mount the IMU (Inertial Measurement Unit, a device for measuring a body's attitude angles at three axes or angular rates and accelerations, generally uses a combination of one accelerometer, one gyroscope per axis for each of the three axes, wherein, acceleration signals of the three axes of a body coordinate system of the object are individually detected by the accelerometers, and the angular rate signals of the body relative to the navigation coordinate system are detected by the gyroscopes, so the three-dimensional angular rates and accelerations of the object can be measured to calculate the solution of the object attitude) sensor under the antenna phase center and require calibration before delivery, these solutions are not very practical for the low-cost IMU sensor. Moreover, the solution of Shanghai Huace Navigation Technology Ltd. requires to calibrate the error of the installation angle caused during the production process, but it does not disclose how to calibrate the installation angle (such as the curvature of the pole) caused in the operations.

SUMMARY

In order to solve the problems of low work efficiency and large tilt measurement error that are attributed to the magnetic angular measuring system of the existing GNSS RTK surveying instrument, the present disclosure aims to provide a method for tilt measurement and compensation of a GNSS RTK surveying instrument based on a GNSS receiver and an IMU sensor.

The technical solution proposed by the present disclosure is as follows.

A method for tilt measurement and compensation of a GNSS RTK surveying instrument based on a GNSS receiver and an IMU sensor, the GNSS RTK surveying instrument includes a pole, a GNSS receiver, an IMU sensor, and a microprocessor, wherein the GNSS receiver is provided at a pole tip, the IMU sensor is provided on the pole and includes a three-axis accelerometer and a three-axis gyroscope, and the microprocessor is also provided on the pole and communicates with the GNSS receiver and the IMU sensor, respectively;

the method for tilt measurement and compensation of the GNSS RTK surveying instrument includes: wirelessly receiving GNSS data by the GNSS receiver, collecting and acquiring IMU data by the IMU sensor, and obtaining a position coordinate of a bottom end of the pole by the microprocessor according to the following steps:

S101, establishing a dynamical model and an observational model of a Kalman filter:

$$\begin{cases} x_k = Fx_{k-1} + w_{k-1} \\ y_k = Hx_k + v_x \end{cases}$$

where, $x_k$ is a state value of an unknown state variable x at a time point k, $x_{k-1}$ is a state value of the unknown state variable x at a time point (k−1), $y_k$ is an observational value of a known observational variable y at the time point k, F is a transfer matrix, H is an observational matrix, $w_{k-1}$ is a Gaussian dynamical noise, $v_k$ is a Gaussian observational noise, and k is a positive integer; the unknown state variable x includes the following nine variables of the IMU sensor: a longitude error dϕ, a latitude error dλ, a height error dh, an N-direction velocity deviation $dv_n$, an E-direction velocity deviation $dv_e$, a D-direction velocity deviation $dv_d$, a roll angle deviation $dρ_r$, a pitch angle deviation $dρ_p$, and a yaw angle deviation $dρ_q$, in a north-east-down (NED) coordinate system; the known observational variable y includes the following six observational variables of the IMU sensor: a longitude observational error Δϕ, a latitude observational error Δλ, a height observational error Δh, an N-direction velocity observational deviation $Δv_n$, an E-direction velocity observational deviation $Δv_e$, and a D-direction velocity observational deviation $Δv_d$, in the NED coordinate system;

S102, after setting a tilt measurement mode, acquiring an initial state value $x_0$ of the unknown state variable x, and initializing the variable k to 1;

S103, after a unit of time Δτ, synchronously reading the GNSS data and the IMU data at the time point k;

S104, acquiring a coordinate of an antenna phase center of the GNSS receiver at the time point k according to the GNSS data obtained from reading, the coordinate includes a longitude $ϕ_k^{gnss}$, a latitude $λ_k^{gnss}$, and a height $h_k^{gnss}$, in the NED coordinate system; acquiring original three-dimensional attitude angles of the IMU sensor at the time point k according to the IMU data obtained from reading, the original three-dimensional attitude angles include a roll angle $(ρ̃_r)_k$, a pitch angle $(ρ̃_p)_k$ and a yaw angle $(ρ̃_q)_k$, and acquiring the observational value $y_k$ of the known observational variable y at the time point k according to the GNSS data and the IMU data obtained from reading;

S105, predicting and correcting the unknown state variable x to obtain the state value $x_k$ of the unknown state variable x at the time point k according to the dynamical model and the observational model of the Kalman filter;

S106, correcting the original three-dimensional attitude angles $((ρ̃_r)_k\ ((ρ̃_p)_k\ ((ρ̃_q)_k)^T$ of the IMU sensor at the time point k by a roll angle deviation $(dρ_r)_k$ at the time point k, a pitch angle deviation $(dρ_p)_k$ at the time point k, and a yaw angle deviation $(dρ_q)_k$ at the time point k in the state value $x_k$ at the time point k in an one-to-one correspondence to obtain corrected three-dimensional attitude angles at the time point k: a roll angle $(ρ_r)_k$, a pitch angle $(ρ_p)_k$, and a yaw angle $(ρ_q)_k$, of the IMU sensor from an XYZ coordinate system to the NED coordinate system, wherein the XYZ coordinate system is a three-axis coordinate system of the IMU sensor;

S107, acquiring a rotation matrix $(R_{xyz}^{ned})_k$ at the time point k from the XYZ coordinate system to the NED coordinate system according to the corrected three-dimensional attitude angles at the time point k;

S108, acquiring a position coordinate of the bottom end of the pole at the time point k according to the following formula:

$$\begin{pmatrix}(ϕ_O)_k\\(λ_O)_k\\(h_O)_k\end{pmatrix}=\begin{pmatrix}(ϕ_G)_k\\(λ_G)_k\\(h_G)_k\end{pmatrix}+(R_{xyz}^{ned})_k*\begin{pmatrix}0\\0\\L\end{pmatrix}$$

where, $(ϕ_O)_k$ is a longitude in the NED coordinate system, $(λ_O)_k$ is a latitude in the NED coordinate system, $(h_O)_k$ is a height in the NED coordinate system, and L is a length of the pole; and S109, automatically incrementing the variable k by 1, and then repeating steps S103-S109 until a value of the variable k is equal to or more than 20.

Specifically, the transfer matrix F in the step S101 is obtained by converting and calculating according to a first position error state equation, a first velocity deviation state equation, and a first attitude deviation state equation as follows:

(1) the first position error state equation:

$$\begin{pmatrix}(dϕ)_k\\(dλ)_k\\(dh)_k\end{pmatrix}=$$

$$\begin{pmatrix}(dϕ)_{k1}\\(dλ)_{k1}\\(dh)_{k1}\end{pmatrix}+\begin{pmatrix}\frac{1}{R_M+h_0^{gnss}} & 0 & 0\\ 0 & \frac{1}{\cos(λ_0^{gnss})(R_N+h_0^{gnss})} & 0\\ 0 & 0 & -1\end{pmatrix}\begin{pmatrix}(dv_n)_{k1}\\(dv_e)_{k1}\\(dv_d)_{k1}\end{pmatrix}Δτ$$

(2) the first velocity deviation state equation:

$$\begin{pmatrix}(dv_n)_k\\(dv_e)_k\\(dv_d)_k\end{pmatrix}=\begin{pmatrix}(dv_n)_{k-1}\\(dv_e)_{k-1}\\(dv_d)_{k-1}\end{pmatrix}+\begin{pmatrix}(f_d)_{k-1} & 0 & (f_e)_{k-1}\\ 0 & -(f_d)_{k-1} & -(f_n)_{k-1}\\ (f_n)_{k-1} & -(f_e)_{k-1} & 0\end{pmatrix}\begin{pmatrix}(dρ_r)_{k-1}\\(dρ_p)_{k-1}\\(dρ_q)_{k-1}\end{pmatrix}Δτ$$

(3) the first attitude deviation state equation:

$$\begin{pmatrix}(dρ_r)_k\\(dρ_p)_k\\(dρ_q)_k\end{pmatrix}=\begin{pmatrix}(dρ_r)_{k-1}\\(dρ_p)_{k-1}\\(dρ_q)_{k-1}\end{pmatrix}+\begin{pmatrix}0 & -1/R_N & 0\\ 1/R_M & 0 & 0\\ 0 & -\tan(λ_0^{gnss})/R_N & 0\end{pmatrix}\begin{pmatrix}(dv_e)_{k-1}\\(dv_n)_{k-1}\\(dv_d)_{k-1}\end{pmatrix}Δτ$$

in the equations (1) to (3), $(dϕ)_k$, $(dλ)_k$, $(dh)_k$, $(dv_n)_k$, $(dv_e)_k$, $(dv_d)_k$, $(dρ_r)_k$, $(dρ_p)_k$ and $(dρ_q)_k$ are elements of $x_k$, respectively; $(dϕ)_{k-1}$, $(dλ)_{k-1}$, $(dh)_{k-1}$, $(dv_n)_{k-1}$, $(dv_e)_{k-1}$, $(dv_d)_{k-1}$, $(dρ_r)_{k-1}$, $(dρ_p)_{k-1}$ and $(dρ_q)_{k-1}$ are elements of $x_{k-1}$, respectively;

in the equations (1) to (3), $$R_M=\frac{R(1-ε^2)}{(1-ε^2\sin^2(λ_0^{gnss}))^{\frac{3}{2}}},\ R_N=\frac{R}{(1-ε^2\sin^2(λ_0^{gnss}))^{\frac{1}{2}}},$$

R is a radius of the earth, ε is an eccentricity of the earth, $λ_0^{gnss}$ is a latitude of the antenna phase center obtained from the GNSS data at an initial time, $h_0^{gnss}$ is a height of the antenna phase center obtained from the GNSS data at the initial time, $(f_n)_{k-1}$ is a projection of an acceleration vector in an N-axis and the acceleration vector is obtained from the IMU data at a time point (k−1), $(f_e)_{k-1}$ is a projection of the acceleration vector in an E-axis and the acceleration vector is obtained from the IMU data at the time point (k−1), and $(f_d)_{k-1}$ is a projection of the acceleration vector in a D-axis and the acceleration vector is obtained from the IMU data at the time point (k−1).

Preferably, in the step S101, the unknown state variable x further includes the following six variables of the IMU sensor: an X-axis bias $da_x$ of the three-axis accelerometer, a Y-axis bias $da_y$ of the three-axis accelerometer, a Z-axis bias $da_z$ of the three-axis accelerometer, an X-axis bias $dg_x$ of the three-axis gyroscope, a Y-axis bias $dg_y$ of the three-axis gyroscope, and a Z-axis bias $dg_z$ of the three-axis gyroscope, and in the step S102, initial state values of the six variables are respectively initialized to 0.

More specifically, the transfer matrix F in the step S101 is obtained by converting and calculating according to a second position error state equation, a second velocity deviation state equation, a second attitude deviation state equation, a first-order Markov model of an accelerometer bias, and a first-order Markov model of a gyroscope bias:

(4) the second position error state equation:

$$\begin{pmatrix}(d\phi)_k\\(d\lambda)_k\\(dh)_k\end{pmatrix} = \begin{pmatrix}(d\phi)_{k-1}\\(d\lambda)_{k-1}\\(dh)_{k-1}\end{pmatrix} + \begin{pmatrix}\frac{1}{R_M+h_0^{gnss}} & 0 & 0\\ 0 & \frac{1}{\cos(\lambda_0^{gnss})(R_N+h_0^{gnss})} & 0\\ 0 & 0 & -1\end{pmatrix}\begin{pmatrix}(dv_n)_{k-1}\\(dv_e)_{k-1}\\(dv_d)_{k-1}\end{pmatrix}\Delta\tau$$

(5) the second velocity deviation state equation:

$$\begin{pmatrix}(dv_n)_k\\(dv_e)_k\\(dv_d)_k\end{pmatrix} = \begin{pmatrix}(dv_n)_{k-1}\\(dv_e)_{k-1}\\(dv_d)_{k-1}\end{pmatrix} + \left[\begin{pmatrix}(f_d)_{k-1} & 0 & (f_e)_{k-1}\\ 0 & -(f_d)_{k-1} & -(f_n)_{k-1}\\ (f_n)_{k-1} & -(f_e)_{k-1} & 0\end{pmatrix}\begin{pmatrix}(d\rho_r)_{k-1}\\(d\rho_p)_{k-1}\\(d\rho_q)_{k-1}\end{pmatrix} + (R_{xyz}^{ned})_k\begin{pmatrix}(da_y)_{k-1}\\(da_x)_{k-1}\\(da_z)_{k-1}\end{pmatrix}\right]\Delta\tau$$

(6) the second attitude deviation state equation:

$$\begin{pmatrix}(d\rho_p)_k\\(d\rho_r)_k\\(d\rho_q)_k\end{pmatrix} = \begin{pmatrix}(d\rho_p)_{k-1}\\(d\rho_r)_{k-1}\\(d\rho_q)_{k-1}\end{pmatrix} + \left[\begin{pmatrix}1/R_M & 0 & 0\\ 0 & -1/R_N & 0\\ 0 & -\tan(\lambda_0^{gnss})/R_N & 0\end{pmatrix}\begin{pmatrix}(dv_n)_{k-1}\\(dv_e)_{k-1}\\(dv_d)_{k-1}\end{pmatrix} + (R_{xyz}^{ned})_k\begin{pmatrix}(dg_y)_{k-1}\\(dg_x)_{k-1}\\(dg_z)_{k-1}\end{pmatrix}\right]\Delta t$$

(7) the first-order Markov model of the accelerometer bias:

$$\begin{pmatrix}(da_y)_k\\(da_x)_k\\(da_z)_k\end{pmatrix} = \begin{pmatrix}(da_y)_{k-1}\\(da_x)_{k-1}\\(da_z)_{k-1}\end{pmatrix} + \left[\begin{pmatrix}-\alpha_a & 0 & 0\\ 0 & -\alpha_a & 0\\ 0 & 0 & -\alpha_a\end{pmatrix}\begin{pmatrix}(da_y)_{k-1}\\(da_x)_{k-1}\\(da_z)_{k-1}\end{pmatrix} + \begin{pmatrix}\sqrt{2\alpha_a\sigma_a^2}\,\varepsilon_{ay}\\\sqrt{2\alpha_a\sigma_a^2}\,\varepsilon_{ax}\\\sqrt{2\alpha_a\sigma_a^2}\,\varepsilon_{az}\end{pmatrix}\right]\Delta\tau$$

(8) the first-order Markov model of the gyroscope bias:

$$\begin{pmatrix}(dg_y)_k\\(dg_x)_k\\(dg_z)_k\end{pmatrix} = \begin{pmatrix}(dg_y)_{k-1}\\(dg_x)_{k-1}\\(dg_z)_{k-1}\end{pmatrix} + \left[\begin{pmatrix}-\alpha_g & 0 & 0\\ 0 & -\alpha_g & 0\\ 0 & 0 & -\alpha_g\end{pmatrix}\begin{pmatrix}(dg_y)_k\\(dg_x)_k\\(dg_z)_k\end{pmatrix} + \begin{pmatrix}\sqrt{2\alpha_g\sigma_g^2}\,\varepsilon_{gy}\\\sqrt{2\alpha_g\sigma_g^2}\,\varepsilon_{gx}\\\sqrt{2\alpha_g\sigma_g^2}\,\varepsilon_{gz}\end{pmatrix}\right]\Delta\tau$$

in the equations (4)-(6) and the models (7)-(8), $(d\phi)_k$, $(d\lambda)_k$, $(dh)_k$, $(dv_n)_k$, $(dv_e)_k$, $(dv_d)_k$, $(d\rho_r)_k$, $(d\rho_p)_k$, $(d\rho_q)_k$, $(da_x)_k$, $(da_y)_k$, $(da_z)_k$, $(dg_x)_k$, $(dg_y)_k$ and $(dg_z)_k$ are elements of $x_k$, respectively; $(d\phi)_{k-1}$, $(d\lambda)_{k-1}$, $(dh)_{k-1}$, $(dv_n)_{k-1}$, $(dv_e)_{k-1}$, $(dv_d)_{k-1}$, $(d\rho_r)_{k-1}$, $(d\rho_p)_{k-1}$, $(d\rho_q)_{k-1}$, $(da_x)_{k-1}$, $(da_y)_{k-1}$, $(da_z)_{k-1}$, $(dg_x)_{k-1}$, $(dg_y)_{k-1}$ and $(dg_z)_{k-1}$ are elements of $x_{k-1}$, respectively;

in the equations (4)-(6) and the models (7)-(8), $$(R_{xyz}^{ned})_k = (R_{xyz}^{ned})_{k-1} + (R_{xyz}^{ned})_{k-1}(\Omega_{ib}^{xyz} - \Omega_{in}^{xyz})\Delta\tau,$$

$$\Omega_{ib}^{xyz} = \begin{pmatrix}0 & -(w_z)_k & (w_y)_k\\ (w_z)_k & 0 & -(w_x)_k\\ -(w_y)_k & (w_x)_k & 0\end{pmatrix},$$

$$\Omega_{in}^{xyz} = \begin{pmatrix}0 & -w_{in,z}^b & w_{in,y}^b\\ w_{in,z}^b & 0 & -w_{in,x}^b\\ -w_{in,y}^b & w_{in,x}^b & 0\end{pmatrix},$$

$$w_{in}^b = \begin{pmatrix}w_{in,x}^b\\ w_{in,y}^b\\ w_{in,z}^b\end{pmatrix} = (R_{xyz}^{ned})_{k-1}^{-1}\begin{pmatrix}\frac{-(dv_n)_{k-1}}{R_M+h_0^{gnss}}\\ \frac{(dv_e)_{k-1}}{R_N+h_0^{gnss}}\\ \frac{(dv_e)_{k-1}\tan(\lambda_0^{gnss})}{R_N+h_0^{gnss}}\end{pmatrix},$$

$$R_M = \frac{R(1-\varepsilon^2)}{(1-\varepsilon^2\sin^2(\lambda_0^{gnss}))^{\frac{3}{2}}},\ R_N = \frac{R}{(1-\varepsilon^2\sin^2(\lambda_0^{gnss}))^{\frac{1}{2}}},$$

R is the radius of the earth, $\varepsilon$ is the eccentricity of the earth, $\lambda_0^{gnss}$ is a latitude of the antenna phase center obtained from the GNSS data at the initial time point, $h_0^{gnss}$ is a height of the antenna phase center obtained from the GNSS data at the initial time, $(f_n)_{k-1}$ is a projection of an acceleration vector in an N-axis and the acceleration vector is obtained from the IMU data at a time point (k−1), $(f_e)_{k-1}$ is a projection of the acceleration vector in an E-axis and the acceleration vector is obtained from the IMU data at the time point (k−1), $(f_d)_{k-1}$ is a projection of the acceleration vector in a D-axis and the acceleration vector is obtained from the IMU data at the time point (k−1), $\alpha_a$ is a bias constant of the three-axis accelerometer, $\sigma_a^2$ is a bias variance of the three-axis accelerometer, $\varepsilon_{ax}$ is an X-axis white noise driving a bias of the three-axis accelerometer, $\varepsilon_{ay}$ is a Y-axis white noise driving the bias of the three-axis accelerometer, $\varepsilon_{az}$ is a Z-axis white noise driving the bias of the three-axis accelerometer, $\alpha_g$ is a bias constant of the three-axis gyroscope, $\sigma_g^2$ is a bias variance of the three-axis gyroscope, $\varepsilon_{gx}$ is an X-axis white noise driving a bias of the three-axis gyroscope, $\varepsilon_{gy}$ is a Y-axis white noise driving the bias of the three-axis gyroscope, $\varepsilon_{gz}$ is a Z-axis white noise driving the bias of the three-axis gyroscope, $(w_x)_k$ is an X-axis angular velocity obtained from the IMU data at the time point k, $(w_y)_k$ is a Y-axis angular velocity obtained from the IMU data at the time point k, and $(w_z)_k$ is a Z-axis angular velocity obtained from the IMU data at the time point k.

Specifically, in the step S102, the initial state value $x_0$ of the unknown state variable x is obtained according to a method including:

initializing a longitude error $(d\phi)_0$, a latitude error $(d\lambda)_0$, a height error $(dh)_0$, an N-direction velocity deviation $(dv_n)_0$, an E-direction velocity deviation $(dv_e)_0$, and a D-direction velocity deviation $(dv_d)_0$ of the initial state value $x_0$ to 0, respectively;

initializing a roll angle deviation $(dp_r)_0$, a pitch angle deviation $(dp_p)_0$, and a yaw angle deviation $(dp_q)_0$ of the initial state value $x_0$ to the following:

$$\begin{cases} (dp_r)_0 = \sin^{-1}((f_X)_0/g) \\ (dp_p)_0 = \sin^{-1}((f_Y)_0/g) \\ (dp_q)_0 = \tan^{-1}((v_n)_0/(v_e)_0) \end{cases}$$

where, $(f_x)_0$ is an X-axis acceleration obtained from the IMU data at the initial time point, $(f_y)_0$ is a Y-axis acceleration obtained from the IMU data at the initial time point, g is a gravity acceleration at a survey location, $(v_n)_0$ is an N-axis velocity obtained from the GNSS data at the initial time point, and $(v_e)_0$ is an E-axis velocity obtained from the GNSS data at the initial time point.

More specifically, the gravity acceleration g of the survey location is calculated according to the following formula:

$$g = \chi_1(1 + \chi_2(\sin \lambda_0^{gnss})^2 + \chi_3(\sin \lambda_0^{gnss})^4) + (\chi_4 + \chi_5 (\sin \lambda_0^{gnss})^2)h_0^{gnss} + \chi_6(h_0^{gnss})^2$$

where, $\lambda_0^{gnss}$ a latitude of the antenna phase center obtained from the GNSS data at the initial time point, $h_0^{gnss}$ is a height of the antenna phase center obtained from the GNSS data at the initial time point, and $\chi_1, \chi_2, \chi_3, \chi_4, \chi_5$ and $\chi_6$ are well-known parameters for calculating the gravitational acceleration g, respectively.

Preferably, before the step S103, a data synchronization method is further included which includes:

S300, performing a time synchronization for the IMU data according to a one-pulse-per-second (1PPS) signal and a national marine electronics association global position system fix data (NMEA GPGGA) wirelessly acquired by the GNSS receiver.

Specifically, in the step S104, the observational value $y_k$ of the known observational variable y at the time point k is obtained by the following equation set:

$$\begin{cases} \begin{pmatrix} (\Delta\phi)_k \\ (\Delta\lambda)_k \\ (\Delta h)_k \end{pmatrix} = \begin{pmatrix} \phi_k^{imu} \\ \lambda_k^{imu} \\ h_k^{imu} \end{pmatrix} - \begin{pmatrix} \phi_k^{gnss} \\ \lambda_k^{gnss} \\ h_k^{gnss} \end{pmatrix} = \\ \begin{pmatrix} \frac{1}{R_M + h_0^{gnss}} & 0 & 0 \\ 0 & \frac{1}{\cos(\lambda_0^{gnss})(R_N + h_k^{gnss})} & 0 \\ 0 & 0 & -1 \end{pmatrix} (R_{xyz}^{ned})_k D_{imu}^{gnss} \\ \begin{pmatrix} (\Delta v_n)_k \\ (\Delta v_e)_k \\ (\Delta v_d)_k \end{pmatrix} = \begin{pmatrix} (v_n^{imu})_k \\ (v_e^{imu})_k \\ (v_d^{imu})_k \end{pmatrix} - \begin{pmatrix} (v_n^{gnss})_k \\ (v_e^{gnss})_k \\ (v_d^{gnss})_k \end{pmatrix} = -(R_{xyz}^{ned})_k((w_{ib}^b - w_{in}^b)D_{imu}^{gnss}) \end{cases}$$

where, $(\Delta\phi)_k, (\Delta\lambda)_k, (\Delta h)_k, (\Delta v_n)_k, (\Delta v_e)_k$ and $(\Delta v_d)_k$ are elements of $y_k$, respectively, $\phi_k^{imu}$ is the longitude of the IMU sensor at the time point k, $\lambda_k^{imu}$ is the latitude of the IMU sensor at the time point k, $h_k^{imu}$ is the height of the IMU sensor at the time point k, $(v_n^{imu})_k$ is an N-direction velocity of the IMU sensor at the time point k, $(v_e^{imu})_k$ is an E-direction velocity of the IMU sensor at the time point k, $(v_d^{imu})_k$ is a D-direction velocity of the IMU sensor at the time point k, $(v_n^{gnss})_k$ is an N-direction velocity of the antenna phase center of the GNSS receiver at the time point k, $(v_e^{gnss})_k$ is an E-direction velocity of the antenna phase center of the GNSS receiver at the time point k, and $(v_d^{gnss})_k$ is a D-direction velocity of the antenna phase center of the GNSS receiver at the time point k;

where, $$(R_{xyz}^{ned})_k = (R_{xyz}^{ned})_{k-1} + (R_{xyz}^{ned})_{k-1}(\Omega_{ib}^{xyz} - \Omega_{in}^{xyz})\Delta\tau,$$

$$\Omega_{ib}^{xyz} = \begin{pmatrix} 0 & -(w_z)_k & (w_y)_k \\ (w_z)_k & 0 & -(w_x)_k \\ -(w_y)_k & (w_x)_k & 0 \end{pmatrix},$$

$$\Omega_{in}^{xyz} = \begin{pmatrix} 0 & -w_{in,z}^b & w_{in,y}^b \\ w_{in,z}^b & 0 & -w_{in,x}^b \\ -w_{in,y}^b & w_{in,x}^b & 0 \end{pmatrix},$$

$$w_{in}^b = \begin{pmatrix} w_{in,x}^b \\ w_{in,y}^b \\ w_{in,z}^b \end{pmatrix} = (R_{xyz}^{ned})_{k-1}^{-1} \begin{pmatrix} \frac{-(\Delta v_n)_{k-1}}{R_M + h_0^{gnss}} \\ \frac{(\Delta v_e)_{k-1}}{R_N + h_0^{gnss}} \\ \frac{(\Delta v_e)_{k-1}\tan(\lambda_0^{gnss})}{R_N + h_0^{gnss}} \end{pmatrix}, w_{in}^b = \begin{pmatrix} (w_x)_k \\ (w_y)_k \\ (w_z)_k \end{pmatrix},$$

$$R_M = \frac{R(1-\varepsilon^2)}{(1-\varepsilon^2\sin^2(\lambda_0^{gnss}))^{\frac{3}{2}}}, R_N = \frac{R}{(1-\varepsilon^2\sin^2(\lambda_0^{gnss}))^{\frac{1}{2}}},$$

R is the radius of the earth, $\varepsilon$ is the eccentricity of the earth, $\lambda_0^{gnss}$ is a latitude of the antenna phase center obtained from the GNSS data at the initial time point, $h_0^{gnss}$ is a height of the antenna phase center obtained from the GNSS data at the initial time point, $(w_x)_k$ is an X-axis angular velocity obtained from the IMU data at the time point k, $(w_y)_k$ is a Y-axis angular velocity obtained from the IMU data at the time point k, and $(w_z)_k$ is a Z-axis angular velocity obtained from the IMU data at the time point k, $(\Delta v_n)_{k-1}$ and $(\Delta v_e)_{k-1}$ are elements of $y_k$, respectively, and $D_{imu}^{gnss}$ is a three-dimensional vector from an origin of the XYZ coordinate system to the antenna phase center of the GNSS receiver.

Specifically, in the step S107, the rotation matrix $(R_{xyz}^{ned})_k$ at the time point k is obtained according to the following formula:

$$(R_{xyz}^{ned})_k = \begin{pmatrix} \cos((\rho_q)_k)\cos((\rho_r)_k) + \sin((\rho_q)_k)\sin((\rho_p)_k)*\sin((\rho_r)_k) & \sin((\rho_q)_k)\cos((\rho_p)_k) & \cos((\rho_q)_k)\sin((\rho_r)_k) - \sin((\rho_q)_k)\sin((\rho_p)_k)\cos((\rho_r)_k) \\ -\sin((\rho_q)_k)\cos((\rho_r)_k) + \cos((\rho_q)_k)\sin((\rho_p)_k)\sin((\rho_r)_k) & \cos((\rho_q)_k)\cos((\rho_p)_k) & -\sin((\rho_q)_k)\sin((\rho_r)_k) - \cos((\rho_q)_k)\sin((\rho_p)_k)\cos((\rho_r)_k) \\ -\cos((\rho_p)_k)\sin((\rho_r)_k) & \sin((\rho_p)_k) & \cos((\rho_p)_k)\cos((\rho_r)_k) \end{pmatrix}^{-1}.$$

Preferably, after the step S102, a self-calibration method of an installation angle as described in steps S201-S204 is further included, which includes:

S201, by performing the steps S103-S108, successively acquiring S position coordinates of the bottom end of the pole corresponding to different antenna phase center positions during movements of the pole including: $((\phi_O)_{k1} (\lambda_O)_{k1} (h_O)_{k1})^T, ((\phi_O)_{k2} (\lambda_O)_{k2} (h_O)_{k2})^T, \ldots, ((\phi_O)_{kS} (\lambda_O)_{kS} (h_O)_{kS})^T$, wherein S is a natural number equal to or more than 2, the $S^{th}$ position coordinate of the bottom end of the pole is a latest acquired position coordinate of the bottom end of the pole;

S202, establishing the following equation set:

$$\begin{cases} \begin{pmatrix} (\phi_O)_{k1} \\ (\lambda_O)_{k1} \\ (h_O)_{k1} \end{pmatrix} + L*(R_{xyz}^{ned})_{k1} \begin{pmatrix} \Delta p \\ -\Delta r \\ 0 \end{pmatrix} - \begin{pmatrix} \phi_O \\ \lambda_O \\ h_O \end{pmatrix} = 0 \\ \begin{pmatrix} (\phi_O)_{k2} \\ (\lambda_O)_{k2} \\ (h_O)_{k2} \end{pmatrix} + L*(R_{xyz}^{ned})_{k2} \begin{pmatrix} \Delta p \\ -\Delta r \\ 0 \end{pmatrix} - \begin{pmatrix} \phi_O \\ \lambda_O \\ h_O \end{pmatrix} = 0 \\ \vdots \\ \begin{pmatrix} (\phi_O)_{kS} \\ (\lambda_O)_{kS} \\ (h_O)_{kS} \end{pmatrix} + L*(R_{xyz}^{ned})_{kS} \begin{pmatrix} \Delta p \\ -\Delta r \\ 0 \end{pmatrix} - \begin{pmatrix} \phi_O \\ \lambda_O \\ h_O \end{pmatrix} = 0 \end{cases}$$

where, $(R_{xyz}^{ned})_{k1}, (R_{xyz}^{ned})_{k2}, \ldots, (R_{xyz}^{ned})_{kS}$ are rotation matrices obtained by performing the step S107 with a one-to-one correspondence to different antenna phase centers, respectively, L is the length of the pole, $\Delta p$ is an installation pitch angle to be solved, $\Delta r$ is an installation roll angle to be solved, $\phi_O$ is a true longitude of a position of the bottom end of the pole to be solved, $\lambda_O$ is a true latitude of the position of the bottom end of the pole to be solved, and $h_O$ is a true height of the position of the bottom end of the pole to be solved;

S203, operating and solving the foregoing equations to obtain an average installation pitch angle $\Delta p$, an average installation roll angle $\Delta r$, and a true position coordinate of the bottom end of the pole: $(\phi_O \lambda_O h_O)^T$; and S204, if an error between the $S^{th}$ position coordinate of the bottom end of the pole and the true position coordinate of the bottom end of the pole satisfies a predetermined threshold, then generating a prompt indicating that the self-calibration of the installation angle is completed, otherwise repeating the steps S201 to S204.

The advantages of the present disclosure are as follows.

(1) The present disclosure provides a tilt measurement and compensation system based on an extremely low-cost IMU sensor, and by improving the tilt measurement and compensation method, based on the algorithm principle of the Kalman filter, the prediction and the correction of the designed multi-dimensional unknown state variables are cycled for multiple times to make the multi-dimensional unknown state variables approach the true values as much as possible. Then, based on the multi-dimensional unknown state variables, the latest three-dimensional attitude angles (i.e., the roll angle, the pitch angle and the yaw angle) from the XYZ coordinate system to the NED coordinate system and the latest rotation matrix can be obtained efficiently and accurately. In the end, the coordinate of the antenna phase center of the GNSS receiver is reduced to the coordinate of the bottom end of the pole by a geometric transformation, thereby completing the tilt measurement.

(2) The surveyor is completely free from the task of centering the level bubble and leveling the pole, which improves the work efficiency. Moreover, without introducing the magnetic components, the tilt measurement is immune to magnetic disturbances, so the tilt measurement errors can be avoided, ensuring the accuracy of the tilt measurement.

(3) The IMU sensor can be placed anywhere inside the GNSS receiver, and the magnetic sensor may or may not be included, thereby improving the design flexibility and reducing the production difficulty of the GNSS RTK surveying instrument and facilitating practical application.

(4) The installation pitch angle and the installation roll angle can be estimated, so that the angular error caused during the assembling process of the device can be eliminated, and the angular error caused by the non-vertical pole (e.g., curved pole) can be avoided, thereby reducing the application restrictions of the device, and being appropriate for various kinds of poles without requiring any type of factory calibration as the self-calibration can always be done during operation. Compared with conventional GNSS tilt measurement and compensation and competing products, the present disclosure greatly improves the work efficiency and accuracy and eliminates the unnecessary production processes.

BRIEF DESCRIPTION OF THE DRAWINGS

In order to clarify the embodiments of the present disclosure or the technical solutions in the prior art, the drawings used in the description of the embodiments or the prior art will be briefly described below. Obviously, the drawings described below merely relate to some embodiments of the present disclosure, and those skilled in the art can obtain other drawings based on these drawings without any creative effort.

Figure 1:
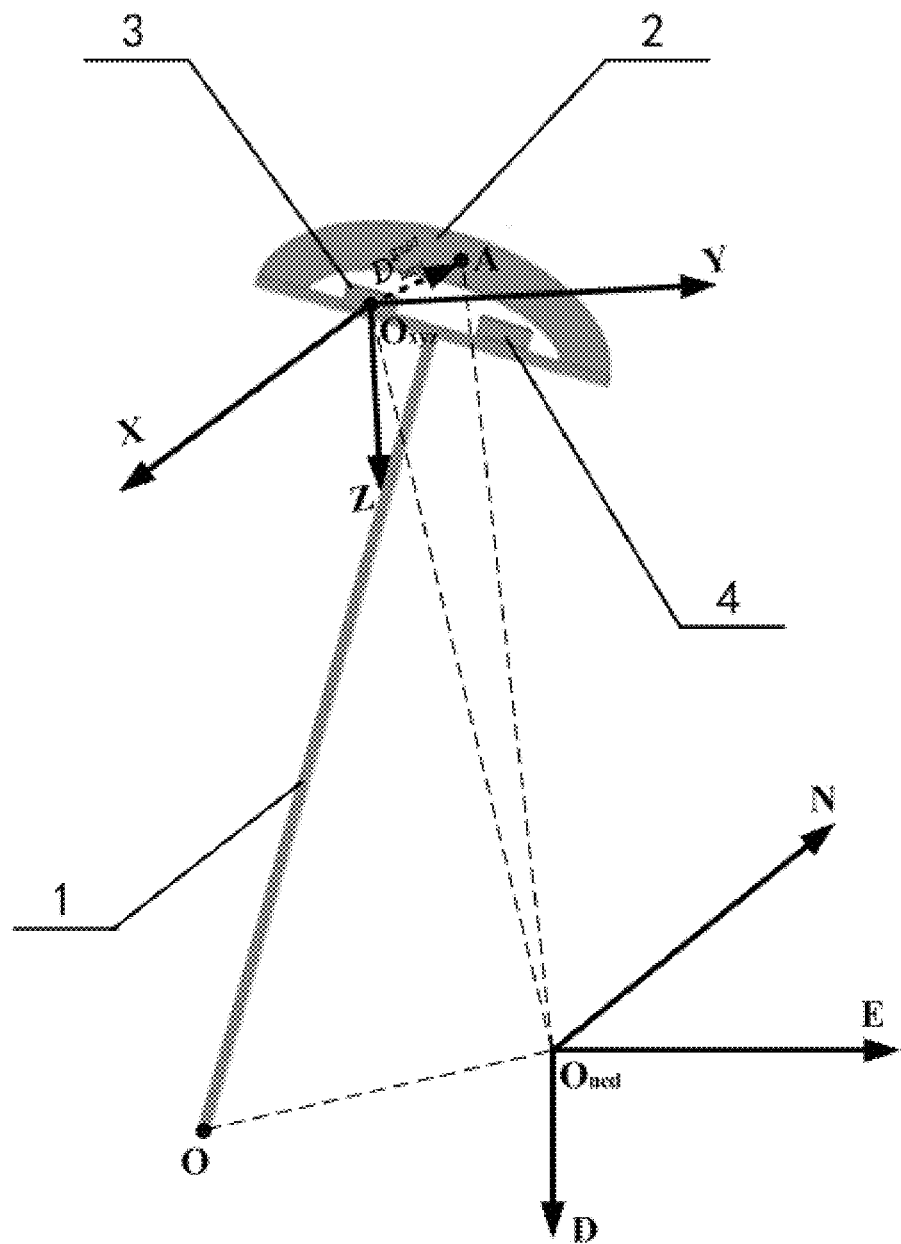
FIG. 1 is a structural schematic diagram of a GNSS RTK surveying instrument applied in a tilt measurement according to the present disclosure.

Reference numerals in the drawings are described below: 1—pole; 2—GNSS receiver; 3—IMU sensor; and 4—microprocessor.

DETAILED DESCRIPTION OF THE EMBODIMENTS

The present disclosure will be further described below with reference to the drawings and specific embodiments. It should be noted that the illustration of the embodiments is intended to facilitate the understanding of the present disclosure rather than limiting the present disclosure. The specific structural and functional details disclosed in this application are merely illustration of the exemplary embodiments of the present disclosure. Moreover, the present disclosure may be embodied with many options and they should not be understood that the present disclosure is limited to the embodiments set forth in this application.

It should be understood that, although the terms first, second, etc. may be used in this application to describe various elements, these elements should not be considered as being limited by these terms which merely aim to distinguish one unit from another. For example, a first unit could be termed as a second unit, vice versa without departing from the scope of the exemplary embodiments of the present disclosure.

It should be understood that the term "and/or" in this application merely indicates the correlation of related objects, which may include three cases. For example, A and/or B may indicate only A, only B, or A and B. The term "/and" in this application represents another correlation of related objects, which may include two cases. For example, A/and B may indicate only A, or only A and B. In addition, the symbol "/" in this application basically indicates that the correlated pre-object and the post-object are alternative.

It should be understood that, when it is recited that a unit is "connected", "interconnected" or "coupled" to another unit, the unit may be directly connected or coupled to the another unit, or the unit may be connected or coupled to the another unit through an intermediate unit. Comparatively, when it is recited that a unit is "directly interconnected" or "directly coupled" to another unit, there is no intermediate unit. Other terms used to describe the relationship between the units should be interpreted in a similar manner (e.g., "between . . . and . . . " versus "directly between . . . and . . . ", "adjacent" versus "directly adjacent", etc.).

The terms in this application are merely intended to describe specific embodiments rather than limit the exemplary embodiments of the present disclosure. For example, in this application, "a", "one" and "the" followed by singular are intended to include the plural, unless there is an evident opposite meaning according to the context. It should also be understood that the terms "include", "including", "comprise" and/or "comprising" used in this application specify the existence of the claimed features, integers, steps, operations, units and/or components without excluding the existence of one or more other features, quantities, steps, operations, units, components and/or the combination thereof, or addition.

It should also be noted that in some alternative embodiments, the functions/movements may present in different order compared with the drawings. For example, depending on the functions/acts involved, two figures shown in succession may essentially be performed synchronously or in a reverse order.

Specific details are provided in the following description in order to facilitate a thorough understanding of the exemplary embodiments. However, it should be understood by those of ordinary skill in the art that the exemplary embodiments may be implemented without these specific details. For example, the system may be shown in a block diagram to avoid unnecessary details obscuring the examples. In other embodiments, well-known processes, structures, and techniques may not be shown as the unnecessary details to avoid obscuring the exemplary embodiments.

Embodiment 1

Figure 2:
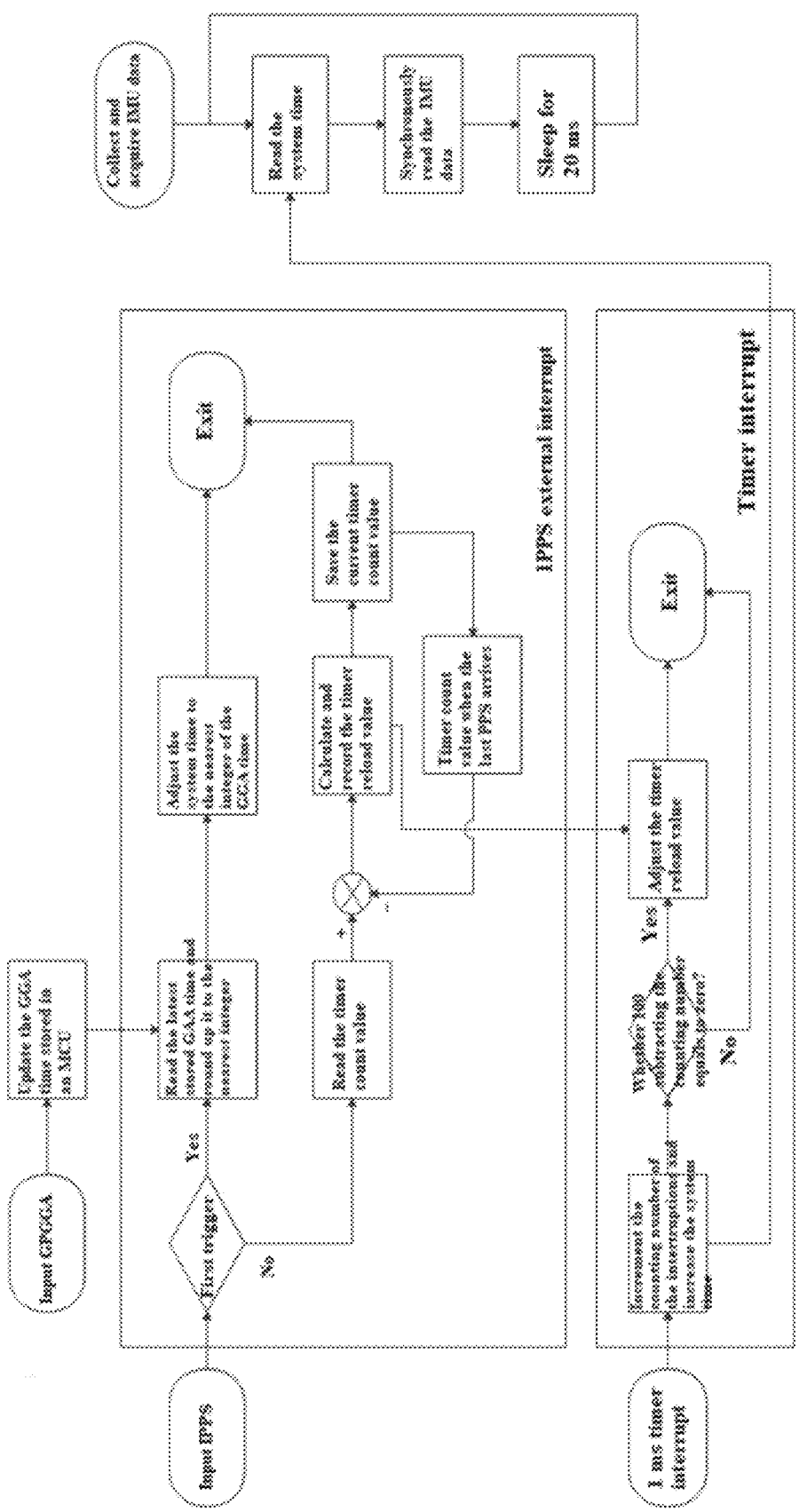
FIG. 2 is a flow chart showing a method for synchronously reading GNSS data and IMU data in a GNSS RTK surveying instrument according to the present disclosure.

As shown in FIGS. 1-2, a GNSS RTK surveying instrument provided in this embodiment includes the pole 1, the GNSS receiver 2, the IMU sensor 3 and the microprocessor 4. The GNSS receiver 2 is provided at the tip of the pole 1. The IMU sensor 3 is provided on the pole 1 and includes a three-axis accelerometer and a three-axis gyroscope. The microprocessor 4 is also provided on the pole 1 and is in communication with the GNSS receiver 2 and the IMU sensor 3, respectively. As shown in FIG. 1, the pole 1, the GNSS receiver 2, the IMU sensor 3, and the microprocessor 4 are all common accessories of the existing GNSS RTK surveying instrument. The difference between the GNSS RTK surveying instrument of this embodiment and the existing GNSS RTK surveying instrument is that, by employing the following novel tilt measurement and compensation method, the IMU sensor 3 can be randomly arranged on the pole 1 like the microprocessor 4 rather than being limited right under the GNSS receiver 2, thereby greatly reducing unnecessary production processes, production difficulty, and cost.

The method for tilt measurement and compensation of the GNSS RTK surveying instrument includes: wirelessly receiving GNSS data by the GNSS receiver 2, collecting and acquiring IMU data by the IMU sensor 3, and obtaining the position coordinate of the bottom end of the pole 1 by the microprocessor 4 according to the following steps S101-S108. The GNSS data is a commonly used term when it comes to the existing GNSS receivers, and the GNSS data includes, but is not limited to, 1PPS signals (i.e., GPS-disciplined crystal oscillator outputs a 10 MHz signal which is subjected to frequency division for 10M times to obtain the time information of one pulse per second (1 pps)) and NMEA GPGGA data (NMEA is the abbreviation of National Marine Electronics Association of U.S., which is nowadays used as a unified standard protocol of Radio Technical Commission for Maritime Services (RTCM) for GPS navigation devices; and GPGGA is the sentences of the output format of the GPS data, which means the main data of GPS positioning of one frame, which is one of the most widely used data in the NMEA format. The sentence includes seventeen fields: sentence identification header, Coordinated Universal Time, latitude, N/S Indicator, longitude, E/W Indicator, position fix indicator, number of satellites used, Horizontal Dilution of Precision (HDOP), height of geoid above ellipsoid, height unit, geoid Separation, height unit, age of differential GPS data, differential reference station ID, checksum, which are separated by 14 commas, respectively). The longitude, latitude, height, N-direction velocity, E-direction velocity, D-direction velocity, etc., of the antenna phase center in the NED coordinate system (i.e., the geographic coordinate system, also known as the north-east-down coordinate system or the navigation coordinate system, is a reference coordinate system for navigation solution selected according to the needs of the navigation system during navigation, and the definition of the axes of the NED coordinate system is as below: N—a northern axis directs to the north of the earth; E—an eastern axis directs to the east of the earth; D—an axis perpendicular to the surface of the earth and directs downwards) can be obtained from the GNSS data by existing methods. The IMU data is a commonly used term when it comes to the existing IMU sensors, and the three-axis acceleration, the three-axis angular velocity, and the three-dimensional attitude angle (i.e., roll angle, pitch angle and yaw angle) of the origin of the XYZ coordinate system (i.e., the three-axis coordinate system of the IMU sensor, also known as the vehicle-coordinate system) can be obtained from the IMU data by the existing methods.

S101, a dynamical model and an observational model of a Kalman filter are established as follows:

$$\begin{cases} x_k = F x_{k-1} + w_{k-1} \\ y_k = H x_k + v_k \end{cases}$$

where, $x_k$ is a state value of an unknown state variable x at a time point k, $x_{k-1}$ is a state value of the unknown state variable x at a time point (k−1), $y_k$ is an observational value of known observational variable y at a time point k, F is a transfer matrix, H is an observational matrix, $w_{k-1}$ is a Gaussian dynamical noise, $v_k$ is a Gaussian observational noise, and k is a positive integer; the unknown state variable x includes the following nine variables of the IMU sensor 3: a longitude error dφ, a latitude error dλ, a height error dh, an N-direction velocity deviation $dv_n$, an E-direction velocity deviation $dv_e$, a D-direction velocity deviation $dv_d$, a roll angle deviation $dρ_r$, a pitch angle deviation $dρ_p$, and a yaw angle deviation $dρ_q$, in a north-east-down (NED) coordinate system; the known observational variable y includes the following six observational variables of the IMU sensor 3: a longitude observational error Δφ, a latitude observational error Δλ, a height observational error Δh, an N-direction velocity observational deviation $Δv_n$, an E-direction velocity observational deviation $Δv_e$, and a D-direction velocity observational deviation $Δv_d$, in the NED coordinate system.

In the step S101, the Kalman filter is an algorithm that performs optimal estimation for the system state by inputting and outputting the observational data with the system based on a linear/discrete system state equation. Since the observational data involves the effects of noise and interference in the system, the optimal estimation can also be considered as a filtering process. The working principle of the Kalman filter can be found in the existing literature "Kalman filter: from principle to implementation" (https://www.cnblogs.com/zhoug2020/p/8376509.html).

In the step S101, specifically, the matrix elements of the transfer matrix F can be derived from conventional formulas by a person skilled in the art according to the existing geographic surveying and mapping knowledge. For example, the matrix elements of the transfer matrix F may be, but not limited to, obtained by converting and calculating according to a first position error state equation, a first velocity deviation state equation, and a first attitude deviation state equation below:

(1) the first position error state equation:

$$\begin{pmatrix} (d\phi)_k \\ (d\lambda)_k \\ (dh)_k \end{pmatrix} =$$

$$\begin{pmatrix} (d\phi)_{k-1} \\ (d\lambda)_{k-1} \\ (dh)_{k-1} \end{pmatrix} + \begin{pmatrix} \frac{1}{R_M + h_0^{gnss}} & 0 & 0 \\ 0 & \frac{1}{\cos(\lambda_0^{gnss})(R_N + h_k^{gnss})} & 0 \\ 0 & 0 & -1 \end{pmatrix} \begin{pmatrix} (dv_n)_{k-1} \\ (dv_e)_{k-1} \\ (dv_d)_{k-1} \end{pmatrix} \Delta \tau$$

(2) the first velocity deviation state equation:

$$\begin{pmatrix} (dv_n)_k \\ (dv_e)_k \\ (dv_d)_k \end{pmatrix} =$$

$$\begin{pmatrix} (dv_n)_{k-1} \\ (dv_e)_{k-1} \\ (dv_d)_{k-1} \end{pmatrix} + \begin{pmatrix} (f_d)_{k-1} & 0 & (f_e)_{k-1} \\ 0 & -(f_d)_{k-1} & -(f_n)_{k-1} \\ (f_n)_{k-1} & -(f_e)_{k-1} & 0 \end{pmatrix} \begin{pmatrix} (d\rho_r)_{k-1} & 1 \\ (d\rho_p)_{k-1} & \\ (d\rho_q)_{k-1} & \end{pmatrix} \Delta \tau$$

(3) the first attitude deviation state equation:

$$\begin{cases} (d\rho_r)_k \\ (d\rho_p)_k \\ (d\rho_q)_k \end{cases} = \begin{cases} (d\rho_r)_{k-1} \\ (d\rho_p)_{k-1} \\ (d\rho_q)_{k-1} \end{cases} + \begin{pmatrix} 0 & -1/R_N & 0 \\ 1/R_M & 0 & 0 \\ 0 & -\tan(\lambda_0^{gnss})/R_N & 0 \end{pmatrix} \begin{pmatrix} (dv_e)_{k-1} \\ (dv_n)_{k-1} \\ (dv_d)_{k-1} \end{pmatrix} \Delta \tau$$

in the equations (1) to (3), $(d\phi)_k$, $(d\lambda)_k$, $(dh)_k$, $(dv_n)_k$, $(dv_e)_k$, $(dv_d)_k$, $(d\rho_r)_k$, $(d\rho_p)_k$ and $(d\rho_q)_k$ are elements of $x_k$, respectively; $(d\phi)_{k-1}$, $(d\lambda)_{k-1}$, $(dh)_{k-1}$, $(dv_n)_{k-1}$, $(dv_e)_{k-1}$, $(dv_d)_{k-1}$, $(d\rho_r)_{k-1}$, $(d\rho_p)_{k-1}$ and $(d\rho_q)_{k-1}$ are elements of $x_{k-1}$, respectively;

in the equations (1) to (3), $$R_M = \frac{R(1-\varepsilon^2)}{(1-\varepsilon^2 \sin^2(\lambda_0^{gnss}))^{\frac{3}{2}}}, R_N = \frac{R}{(1-\varepsilon^2 \sin^2(\lambda_0^{gnss}))^{\frac{1}{2}}},$$

R is the radius of the earth, ε is the eccentricity of the earth, $\lambda_0^{gnss}$ is a latitude of the antenna phase center obtained from the GNSS data at an initial time, $h_0^{gnss}$ is a height of the antenna phase center obtained from the GNSS data at the initial time, $(f_n)_{k-1}$ is a projection of an acceleration vector in the N-axis and the acceleration vector is obtained from the IMU data at the time point (k−1), $(f_e)_{k-1}$ is a projection of an acceleration vector in the E-axis and the acceleration vector is obtained from the IMU data at the time point (k−1), and $(f_d)_{k-1}$ is a projection of an acceleration vector in the D-axis and the acceleration vector is obtained from the IMU data at the time point (k−1).

In the step S101, specifically, the expanded observational matrix H is shown below:

$$H = \begin{pmatrix} 1 & 0 & 0 & 0 & 0 & 0 & 0 & 0 & 0 \\ 0 & 1 & 0 & 0 & 0 & 0 & 0 & 0 & 0 \\ 0 & 0 & 1 & 0 & 0 & 0 & 0 & 0 & 0 \\ 0 & 0 & 0 & 1 & 0 & 0 & 0 & 0 & 0 \\ 0 & 0 & 0 & 0 & 1 & 0 & 0 & 0 & 0 \\ 0 & 0 & 0 & 0 & 0 & 1 & 0 & 0 & 0 \end{pmatrix}.$$

In the step S101, preferably, taking into account the bias of the three-axis accelerometer and the three-axis gyroscope in the IMU sensor 3 and its impacts on the modeling accuracy of the Kalman filter, the unknown state variable x may further include the following six variables of the IMU sensor 3: an X-axis bias $da_x$ of the three-axis accelerometer, a Y-axis bias $da_y$ of the three-axis accelerometer, a Z-axis bias $da_z$ of the three-axis accelerometer, an X-axis bias $dg_x$ of the three-axis gyroscope, a Y-axis bias $dg_y$ of the three-axis gyroscope, and a Z-axis bias $dg_z$ of the three-axis gyroscope. Therefore, the unknown state variable x includes a total of fifteen variables, and more variables may be included as needed.

More specifically, when the unknown state variable x includes a total of fifteen variables, the matrix elements of the transfer matrix F can be derived based on conventional formulas by a person skilled in the art according to the existing geographic surveying and mapping knowledge. For example, it may, but is not limited to, be obtained by converting and calculating according to a second position error state equation, a second velocity deviation state equation, a second attitude deviation state equation, a first-order Markov model of an accelerometer bias, and a first-order Markov model of a gyroscope bias:

(4) the second position error state equation:

$$\begin{pmatrix}(d\phi)_k \\ (d\lambda)_k \\ (dh)_k\end{pmatrix} =$$

$$\begin{pmatrix}(d\phi)_{k-1} \\ (d\lambda)_{k-1} \\ (dh)_{k-1}\end{pmatrix} + \begin{pmatrix}\frac{1}{R_M + h_0^{gnss}} & 0 & 0 \\ 0 & \frac{1}{\cos(\lambda_0^{gnss})(R_N + h_0^{gnss})} & 0 \\ 0 & 0 & -1\end{pmatrix}\begin{pmatrix}(dv_n)_{k-1} \\ (dv_e)_{k-1} \\ (dv_d)_{k-1}\end{pmatrix}\Delta\tau$$

(5) the second velocity deviation state equation $$\begin{pmatrix}(dv_n)_k \\ (dv_e)_k \\ (dv_d)_k\end{pmatrix} = \begin{pmatrix}(dv_n)_{k-1} \\ (dv_e)_{k-1} \\ (dv_d)_{k-1}\end{pmatrix} +$$

$$\left[\begin{pmatrix}(f_d)_{k-1} & 0 & (f_e)_{k-1} \\ 0 & -(f_d)_{k-1} & -(f_n)_{k-1} \\ (f_n)_{k-1} & -(f_e)_{k-1} & 0\end{pmatrix}\begin{pmatrix}(d\rho_r)_{k-1} \\ (d\rho_p)_{k-1} \\ (d\rho_q)_{k-1}\end{pmatrix} + (R_{xyz}^{ned})_k \begin{pmatrix}(da_y)_{k-1} \\ (da_x)_{k-1} \\ (da_z)_{k-1}\end{pmatrix}\right]\Delta\tau$$

(6) the second attitude deviation state equation:

$$\begin{pmatrix}(d\rho_p)_k \\ (d\rho_r)_k \\ (d\rho_q)_k\end{pmatrix} = \begin{pmatrix}(d\rho_p)_{k-1} \\ (d\rho_r)_{k-1} \\ (d\rho_q)_{k-1}\end{pmatrix} +$$

$$\left[\begin{pmatrix}1/R_M & 0 & 0 \\ 0 & -1/R_N & 0 \\ 0 & -\tan(\lambda_0^{gnss})/R_N & 0\end{pmatrix}\begin{pmatrix}(dv_n)_{k-1} \\ (dv_e)_{k-1} \\ (dv_q)_{k-1}\end{pmatrix} + (R_{xyz}^{ned})_k \begin{pmatrix}(dg_y)_{k-1} \\ (dg_x)_{k-1} \\ (dg_z)_{k-1}\end{pmatrix}\right]\Delta t$$

(7) the first-order Markov model of the accelerometer bias $$\begin{pmatrix}(da_y)_k \\ (da_x)_k \\ (da_z)_k\end{pmatrix} =$$

$$\begin{pmatrix}(da_y)_{k-1} \\ (da_x)_{k-1} \\ (da_z)_{k-1}\end{pmatrix} + \left[\begin{pmatrix}-\alpha_a & 0 & 0 \\ 0 & -\alpha_a & 0 \\ 0 & 0 & -\alpha_a\end{pmatrix}\begin{pmatrix}(da_y)_k \\ (da_x)_k \\ (da_z)_k\end{pmatrix} + \begin{pmatrix}\sqrt{2\alpha_a \sigma_a^2}\,\varepsilon_{ay} \\ \sqrt{2\alpha_a \sigma_a^2}\,\varepsilon_{ax} \\ \sqrt{2\alpha_a \sigma_a^2}\,\varepsilon_{az}\end{pmatrix}\right]\Delta\tau$$

(8) the first-order Markov model of the gyroscope bias:

$$\begin{pmatrix}(dg_y)_k \\ (dg_x)_k \\ (dg_z)_k\end{pmatrix} =$$

$$\begin{pmatrix}(dg_y)_{k-1} \\ (dg_x)_{k-1} \\ (dg_z)_{k-1}\end{pmatrix} + \left[\begin{pmatrix}-\alpha_g & 0 & 0 \\ 0 & -\alpha_g & 0 \\ 0 & 0 & -\alpha_g\end{pmatrix}\begin{pmatrix}(dg_y)_k \\ (dg_x)_k \\ (dg_z)_k\end{pmatrix} + \begin{pmatrix}\sqrt{2\alpha_g \sigma_g^2}\,\varepsilon_{gy} \\ \sqrt{2\alpha_g \sigma_g^2}\,\varepsilon_{gx} \\ \sqrt{2\alpha_g \sigma_g^2}\,\varepsilon_{gz}\end{pmatrix}\right]\Delta\tau$$

in the equations (4)-(6) and the models (7)-(8), $(d\phi)_k$, $(d\lambda)_k$, $(dh)_k$, $(dv_n)_k$, $(dv_e)_k$, $(dv_d)_k$, $(d\rho_r)_k$, $(d\rho_p)_k$, $(d\rho_q)_k$, $(da_x)_k$, $(da_y)_k$, $(da_z)_k$, $(dg_x)_k$, $(dg_y)_k$ and $(dg_z)_k$ are elements of $x_k$, respectively; $(d\phi)_{k-1}$, $(d\lambda)_{k-1}$, $(dh)_{k-1}$, $(dv_n)_{k-1}$, $(dv_e)_{k-1}$, $(dv_d)_{k-1}$, $(d\rho_r)_{k-1}$, $(d\rho_p)_{k-1}$, $(d\rho_q)_{k-1}$, $(da_x)_{k-1}$, $(da_y)_{k-1}$, $(da_z)_{k-1}$, $(dg_x)_{k-1}$, $(dg_y)_{k-1}$ and $(dg_z)_{k-1}$ are elements of $x_{k-1}$, respectively;

in the equations (4)-(6) and the models (7)-(8), $$(R_{xyz}^{ned})_k = (R_{xyz}^{ned})_{k-1} + (R_{xyz}^{ned})_{k-1}(\Omega_{ib}^{xyz} - \Omega_{in}^{xyz})\Delta\tau,$$

$$\Omega_{ib}^{xyz} = \begin{pmatrix}0 & -(w_z)_k & (w_y)_k \\ (w_z)_k & 0 & -(w_x)_k \\ -(w_y)_k & (w_x)_k & 0\end{pmatrix},$$

$$\Omega_{in}^{xyz} = \begin{pmatrix}0 & -w_{in,z}^b & w_{in,y}^b \\ w_{in,z}^b & 0 & -w_{in,x}^b \\ -w_{in,y}^b & w_{in,x}^b & 0\end{pmatrix},$$

$$w_{in}^b\begin{pmatrix}w_{in,x}^b \\ w_{in,y}^b \\ w_{in,z}^b\end{pmatrix} = (R_{xyz}^{ned})_{k-1}^{-1}\begin{pmatrix}\frac{-(dv_n)_{k-1}}{R_M + h_0^{gnss}} \\ \frac{(dv_e)_{k-1}}{R_N + h_0^{gnss}} \\ \frac{(dv_e)_{k-1}\tan(\lambda_0^{gnss})}{R_N + h_0^{gnss}}\end{pmatrix},$$

$$R_M = \frac{R(1-\varepsilon^2)}{(1-\varepsilon^2\sin^2(\lambda_0^{gnss}))^{\frac{3}{2}}},$$

$$R_N = \frac{R}{(1-\varepsilon^2\sin^2(\lambda_0^{gnss}))^{\frac{1}{2}}},$$

R is the radius of the earth, ε is the eccentricity of the earth, $\lambda_0^{gnss}$ is a latitude of the antenna phase center obtained from the GNSS data at an initial time, $h_0^{gnss}$ is a height of the antenna phase center obtained from the GNSS data at the initial time, $(f_n)_{k-1}$ is a projection of an acceleration vector in the N-axis and the acceleration vector is obtained from the IMU data at a time point (k−1), $(f_e)_{k-1}$ is a projection of the acceleration vector in the E-axis and the acceleration vector is obtained from the IMU data at the time point (k−1), $(f_d)_{k-1}$ is a projection of the acceleration vector in the D-axis and the acceleration vector is obtained from the IMU data at the time point (k−1), $\alpha_a$ is a bias constant of the three-axis accelerometer, $\sigma_a^2$ is a bias variance of the three-axis accelerometer, $\varepsilon_{ax}$ is an X-axis white noise driving the bias of the three-axis accelerometer, $\varepsilon_{ay}$ is a Y-axis white noise driving the bias of the three-axis accelerometer, $\varepsilon_{az}$ is a Z-axis white noise driving the bias of the three-axis accelerometer, $\alpha_g$ is a bias constant of the three-axis gyroscope, $\sigma_g^2$ is a bias variance of the three-axis gyroscope, $\varepsilon_{gx}$ is an X-axis white noise driving the bias of the three-axis gyroscope, $\varepsilon_{gy}$ is a Y-axis white noise driving the bias of the three-axis gyroscope, $\varepsilon_{gz}$ is a Z-axis white noise driving the bias of the three-axis gyroscope, $(w_x)_k$ is an X-axis angular velocity obtained from the IMU data at the time point k, $(w_y)_k$ is a Y-axis angular velocity obtained from the IMU data at the time point k, and $(w_z)_k$ is a Z-axis angular velocity obtained from the IMU data at the time point k.

More specifically, when the unknown state variable x includes a total of fifteen variables, the observational matrix H will change accordingly, and the specific expanded observational matrix H is shown below:

$$H = \begin{pmatrix} 1 & 0 & 0 & 0 & 0 & 0 & 0 & 0 & 0 & 0 & 0 & 0 & 0 & 0 & 0 \\ 0 & 1 & 0 & 0 & 0 & 0 & 0 & 0 & 0 & 0 & 0 & 0 & 0 & 0 & 0 \\ 0 & 0 & 1 & 0 & 0 & 0 & 0 & 0 & 0 & 0 & 0 & 0 & 0 & 0 & 0 \\ 0 & 0 & 0 & 1 & 0 & 0 & 0 & 0 & 0 & 0 & 0 & 0 & 0 & 0 & 0 \\ 0 & 0 & 0 & 0 & 1 & 0 & 0 & 0 & 0 & 0 & 0 & 0 & 0 & 0 & 0 \\ 0 & 0 & 0 & 0 & 0 & 1 & 0 & 0 & 0 & 0 & 0 & 0 & 0 & 0 & 0 \end{pmatrix}.$$

S102, after setting a tilt measurement mode, an initial state value $x_0$ of the unknown state variable x is obtained, and the variable k is initialized to 1.

In the step S102, specifically, when the unknown state variable x includes nine variables, the initial state value $x_0$ of the unknown state variable x may be obtained, but not limited to, the following method:

initializing the longitude error $(d\phi)_0$, the latitude error $(d\lambda)_0$, the height error $(dh)_0$, the N-direction velocity deviation $(dv_n)_0$, the E-direction velocity deviation $(dv_e)_0$, and the D-direction velocity deviation $(dv_d)_0$ in the initial state value $x_0$ to 0, respectively;

initializing the roll angle deviation $(d\rho_r)_0$, the pitch angle deviation $(d\rho_p)_0$, and the yaw angle deviation $(d\rho_q)_0$ in the initial state value $x_0$ as follows:

$$\begin{cases} (d\rho_r)_0 = \sin^{-1}((f_x)_0/g) \\ (d\rho_p)_0 = \sin^{-1}((f_y)_0/g) \\ (d\rho_q)_0 = \tan^{-1}((v_n)_0/(v_e)_0) \end{cases}$$

where, $(f_x)_0$ is an X-axis acceleration obtained from the IMU data at the initial time, $(f_y)_0$ is a Y-axis acceleration obtained from the IMU data at the initial time, g is a gravity acceleration of the surveying location, $(v_n)_0$ is a N-axis velocity obtained from the GNSS data at the initial time, and $(v_e)_0$ is an E-axis velocity obtained from the GNSS data at the initial time. Specifically, the gravity acceleration g of the surveying location is calculated according to the following formula:

$$g = \chi_1(1 + \chi_2(\sin \lambda_0^{gnss})^2 + \chi_3(\sin \lambda_0^{gnss})^4) + (\chi_4 + \chi_5 (\sin \lambda_0^{gnss})^2)h_0^{gnss} + \lambda_6(h_0^{gnss})^2$$

where, $\lambda_0^{gnss}$ is a latitude of the antenna phase center obtained from the GNSS data at the initial time, $h_0^{gnss}$ is a height of the antenna phase center obtained from the GNSS data at the initial time, and $\chi_1, \chi_2, \chi_3, \chi_4, \chi_5$ and $\chi_6$ are well-known parameters for calculating the gravitational acceleration g, respectively. Further, more specifically, when the IMU sensor 3 includes a magnetic sensor, the magnetic sensor provides the yaw angle deviation $(d\rho_q)_0$ in the initial state value $x_0$ under the NED coordinate system.

In the step S102, specifically, when the unknown state variable x includes fifteen variables, corresponding initial state values of the X-axis bias $da_x$ of the three-axis accelerometer, the Y-axis bias $da_y$ of the three-axis accelerometer, the Z-axis bias $da_z$ of the three-axis accelerometer, the X-axis bias $dg_x$ of the three-axis gyroscope, the Y-axis bias $dg_y$ of the three-axis gyroscope, and the Z-axis bias $dg_z$ of the three-axis gyroscope are initialized to 0, respectively.

S103, after a unit of time $\Delta\tau$, the GNSS data and the IMU data at the time point k are synchronously read.

Before the step S103, preferably, in order to make the GNSS data and the IMU data have a common time standard, so as to be synchronously read and effectively applied to a standard Kalman filter, a data synchronization method is further included which includes: S300, the 1PPS signal and the NMEA GPGGA data wirelessly acquired by the GNSS receiver 2 are used to perform the time synchronization of the IMU data. As shown in FIG. 2, the microprocessor 4 acquires the 1PPS signal through an external interrupt. Since the 1PPS time point corresponds to the time of integer second, the microprocessor 4 rounds up the newly received GPGGA time to the nearest integer which is used as the initial time of the microprocessor system. On this basis, after the arrival of each subsequent 1PPS signal, the reload value (the reload value is a well-known term in the art, the timer counter decrements by one for each clock rising edge, and when the counter decrements down to 0, the counter reloads to a constant, i.e., the reload value, and then the next round of counting is started) of the timer in the microprocessor is corrected to keep the microprocessor time and GNSS time synchronized. While, for the time of the IMU data, the current microprocessor timestamp is recorded when reading the sensor data. In this embodiment, synchronization can be performed for an oscillator of any degree of stability. Since the oscillator of the system is relatively stable, it does not make sense to adjust the timer at a faster frequency. For example, but not limited to, the reload value of the timer is adjusted every 100 ms. In addition, the unit of time $\Delta\tau$ is a minimum period for periodically reading the GNSS data and the IMU data, as shown in FIG. 2. For example, but not limited to, the unit of time $\Delta\tau$ of 20 ms.

S104, a coordinate of the antenna phase center of the GNSS receiver at the time point k is acquired according to the GNSS data loaded: a longitude $\phi_k^{gnss}$, a latitude $\lambda_k^{gnss}$, and a height $h_k^{gnss}$, under the NED coordinate system; an original three-dimensional attitude angle of the IMU sensor 3 at the time point k is acquired according to the IMU data loaded: a roll angle $(\tilde{\rho}_r)_k$, a pitch angle $(\tilde{\rho}_p)_k$ and a yaw angle $(\tilde{\rho}_q)_k$, and the observational value $y_k$ of the known observational variable y at the time point k is acquired according to the GNSS data loaded and the IMU data loaded.

In the step S104, the coordinate of the phase antenna center at the time point k and the original three-dimensional attitude angle at the time point k are all obtained by methods commonly used in the art, and details are not described herein. But for the observational value $y_k$ at the time point k, the method may be, but not limited to, the following equations:

$$\begin{cases} \begin{pmatrix} (\Delta\phi)_k \\ (\Delta\lambda)_k \\ (\Delta h)_k \end{pmatrix} = \begin{pmatrix} \phi_k^{imu} \\ \lambda_k^{imu} \\ h_k^{imu} \end{pmatrix} - \begin{pmatrix} \phi_k^{gnss} \\ \lambda_k^{gnss} \\ h_k^{gnss} \end{pmatrix} = \begin{pmatrix} \frac{1}{R_M + h_0^{gnss}} & 0 & 0 \\ 0 & \frac{1}{\cos(\lambda_0^{gnss})(R_N + h_0^{gnss})} & 0 \\ 0 & 0 & -1 \end{pmatrix} (R_{xyz}^{ned})_k D_{imu}^{gnss} \\ \begin{pmatrix} (\Delta v_n)_k \\ (\Delta v_e)_k \\ (\Delta v_d)_k \end{pmatrix} = \begin{pmatrix} (v_n^{imu})_k \\ (v_e^{imu})_k \\ (v_d^{imu})_k \end{pmatrix} - \begin{pmatrix} (v_n^{gnss})_k \\ (v_e^{gnss})_k \\ (v_d^{gnss})_k \end{pmatrix} = -(R_{xyz}^{ned})_k ((w_{ib}^b - w_{in}^b) D_{imu}^{gnss}) \end{cases}$$

where, $(\Delta\phi)_k$, $(\Delta\lambda)_k$, $(\Delta h)_k$, $(\Delta v_n)_k$, $(\Delta v_e)_k$ and $(\Delta v_d)_k$ are elements of $y_k$, respectively, $\phi_k^{imu}$ is the longitude of the IMU sensor 3 at the time point k, $\lambda_k^{imu}$ is the latitude of the IMU sensor 3 at the time point k, $h_k^{imu}$ is the height of the IMU sensor 3 at the time point k, $(v_n^{imu})_k$ is an N-direction velocity of the IMU sensor 3 at the time point k, $(v_e^{imu})_k$ is an E-direction velocity of the IMU sensor 3 at the time point k, $(v_d^{imu})_k$ is a D-direction velocity of the IMU sensor 3 at the time point k, $(v_n^{gnss})_k$ is an N-direction velocity of the antenna phase center of the GNSS receiver 2 at the time point k, $(v_e^{gnss})_k$ is an E-direction velocity of the antenna phase center of the GNSS receiver 2 at the time point k, and $(v_d^{gnss})$ is a D-direction velocity of the antenna phase center of the GNSS receiver 2 at the time point k;

where, $$(R_{xyz}^{ned})_k = (R_{xyz}^{ned})_{k-1} + (R_{xyz}^{ned})_{k-1}(\Omega_{ib}^{xyz} - \Omega_{in}^{xyz})\Delta\tau,$$

$$\Omega_{ib}^{xyz} = \begin{pmatrix} 0 & -(w_z)_k & (w_y)_k \\ (w_z)_k & 0 & -(w_x)_k \\ -(w_y)_k & (w_x)_k & 0 \end{pmatrix},$$

$$\Omega_{in}^{xyz} = \begin{pmatrix} 0 & -w_{in,z}^b & w_{in,y}^b \\ w_{in,z}^b & 0 & -w_{in,x}^b \\ -w_{in,y}^b & w_{in,x}^b & 0 \end{pmatrix},$$

$$w_{in}^b = \begin{pmatrix} w_{in,x}^b \\ w_{in,y}^b \\ w_{in,z}^b \end{pmatrix} = (R_{xyz}^{ned})_{k-1}^{-1} \begin{pmatrix} \frac{-(\Delta v_n)_{k-1}}{R_M + h_0^{gnss}} \\ \frac{(\Delta v_e)_{k-1}}{R_N + h_0^{gnss}} \\ \frac{(\Delta v_e)_{k-1}\tan(\lambda_0^{gnss})}{R_N + h_0^{gnss}} \end{pmatrix},$$

$$w_{ib}^b = \begin{pmatrix} (w_x)_k \\ (w_y)_k \\ (w_z)_k \end{pmatrix},$$

$$R_M = \frac{R(1-\varepsilon^2)}{(1-\varepsilon^2\sin^2(\lambda_0^{gnss}))^{\frac{3}{2}}},$$

$$R_N = \frac{R}{(1-\varepsilon^2\sin^2(\lambda_0^{gnss}))^{\frac{1}{2}}},$$

R is the radius of the earth, $\varepsilon$ is the eccentricity of the earth, $\lambda_0^{gnss}$ is the latitude of the antenna phase center obtained from the GNSS data at the initial time, $h_0^{gnss}$ is the height of the antenna phase center obtained from the GNSS data at the initial time, $(w_x)_k$ is an X-axis angular velocity obtained from the IMU data at the time point k, $(w_y)_k$ is a Y-axis angular velocity obtained from the IMU data at the time point k, and $(w_z)_k$ is a Z-axis angular velocity obtained from the IMU data at the time point k, $(\Delta v_n)_{k-1}$ and $(\Delta v_e)_{k-1}$ are elements of $y_k$, respectively, and $D_{imu}^{gnss}$ is a three-dimensional vector from an origin of the XYZ coordinate system to the antenna phase center of the GNSS receiver 2. The values of various dimensional scalars can be measured by measuring devices during production, such as vernier calipers, etc.

S105, the unknown state variable x is predicted and corrected to obtain the state value $x_k$ of the unknown state variable x at the time point k according to the dynamical model and the observational model of the Kalman filter.

In the step S105, $x_{k-1}$ at the time point k–1 has been initialized or corrected in the previous cycle, $y_{k-1}$ at the time point k–1 has been calculated in the previous cycle, and observational value $y_k$ at the time point k has also been newly acquired, therefore, the state value $x_k$ at the time point k is predicted according to the dynamical model $x_k = Fx_{k-1} + w_{k-1}$ based on the algorithm principle of the Kalman filter. Then, the predicted state value $x_k$ at the time point k is corrected according to the observational model $y_k = Hx_k + v_k$ to accurately obtain the state value $x_k$ at the time point k of the unknown state variable x.

S106, the roll angle deviation $(d\rho_r)_k$ at the time point k, the pitch angle deviation $(d\rho_p)_k$ at the time point k, the yaw angle deviation $(d\rho_q)_k$ at the time point k, in the state value $x_k$ at the time point k are applied to correct the original three-dimensional attitude angle $((\tilde{\rho}_r)_k, (\tilde{\rho}_p)_k, (\tilde{\rho}_q)_k)^T$ of the IMU sensor 3 at the time point k in an one-to-one correspondence, to obtain corrected three-dimensional attitude angles: the roll angle $(\rho_r)_k$, the pitch angle $(\rho_p)_k$ and the yaw angle $(\rho_q)_k$, of the IMU sensor at the time point k from the XYZ coordinate system to the NED coordinate system, wherein the XYZ coordinate system is a three-axis coordinate system of the IMU sensor 3.

In the step S106, the specific angle correction mode is addition, for example, for the roll angle:

$$(\rho_r)_k = (\tilde{\rho}_r)_k + (d\rho_r)_k.$$

S107, a rotation matrix $(R_{xyz}^{ned})$ at the time point k from the XYZ coordinate system to the NED coordinate system is acquired according to the corrected three-dimensional attitude angle at the time point k.

In the step S107, specifically, the rotation matrix $(R_{xyz}^{ned})_k$ at the time point k is obtained according to the following formula:

$$(R_{xyz}^{ned})_k = \begin{pmatrix} \cos((\rho_q)_k)\cos((\rho_r)_k) + \sin((\rho_q)_k)*\sin((\rho_r)_k) & \sin((\rho_q)_k)\cos((\rho_p)_k) & \cos((\rho_q)_k)\sin((\rho_r)_k) - \sin((\rho_q)_k)\sin((\rho_p)_k)\cos((\rho_r)_k) \\ -\sin((\rho_q)_k)\cos((\rho_r)_k) + \cos((\rho_q)_k)\sin((\rho_p)_k)\sin((\rho_r)_k) & \cos((\rho_q)_k)\cos((\rho_p)_k) & -\sin((\rho_q)_k)\sin((\rho_r)_k) - \cos((\rho_q)_k)\cos((\rho_r)_k) \\ -\cos((\rho_p)_k)\sin((\rho_r)_k) & \sin((\rho_p)_k) & \cos((\rho_p)_k)\cos((\rho_r)_k) \end{pmatrix}^{-1}.$$

S108, the position coordinate of the bottom end of the pole 1 at the time point k is acquired according to the following formula:

$$\begin{pmatrix} (\phi_O)_k \\ (\lambda_O)_k \\ (h_O)_k \end{pmatrix} = \begin{pmatrix} (\phi_G)_k \\ (\lambda_G)_k \\ (h_G)_k \end{pmatrix} + (R_{xyz}^{ned})_k * \begin{pmatrix} 0 \\ 0 \\ L \end{pmatrix}$$

where, $(\phi_O)_k$ is a longitude in the NED coordinate system, $(\lambda_O)_k$ is a latitude in the NED coordinate system, $(h_O)_k$ is a height in the NED coordinate system, and L is a length of the pole 1, which can be measured by the measuring device during the production process, such as a vernier caliper, etc.

S109, the variable k is incremented by 1 automatically, and then the steps S103-S109 are repeated until the value of the variable k is equal to or more than 20.

With the loop iterations of the step S109, based on the algorithm principle of the Kalman filter, the prediction and the correction of the designed multi-dimensional unknown state variable can be cycled for multiple times, so that the multi-dimensional unknown state variable can approach the true value as much as possible. Then, the latest three-dimensional attitude angle (i.e., roll angle, pitch angle and yaw angle) from the XYZ coordinate system to the NED coordinate system and the latest rotation matrix can be obtained efficiently and accurately based on the multi-dimensional unknown state variable. Finally, the coordinate of the antenna phase center of the GNSS receiver is reduced to the position coordinate of the bottom portion of the pole by geometric transformation, thereby completing the tilt measurement and compensation. It is reported by actual tests that the position coordinate of the bottom end of the pole meeting the measurement accuracy requirement can be generally obtained after more than 20 cycles. Taking, for instance, the unit of time of 20 ms, after the self-tilt measurement mode is started, the position coordinate of the bottom end of the pole can be obtained within 1s, so that the surveying personnel is entirely free of the task of level bubble centering and leveling, which improves the work efficiency. Moreover, the tilt measurement is immune to magnetic disturbances, so the tilt measurement errors can be avoided, which ensures the accuracy of the tilt measurement and compensation.

In summary, the method for tilt measurement and compensation of the GNSS RTK surveying instrument based on the GNSS receiver and the IMU sensor provided by this embodiment has the following technical effects.

(1) The present embodiment provides a tilt measurement and compensation system based on an extremely low-cost IMU sensor, and by improving the tilt measurement and compensation method, based on the algorithm principle of the Kalman filter, the prediction and the correction of the designed multi-dimensional unknown state variable are cycled multiple times to make the multi-dimensional unknown state variable approach the true value as much as possible. Then, based on the multi-dimensional unknown state variable, the latest three-dimensional attitude angle (i.e., the roll angle, the pitch angle and the yaw angle) from the XYZ coordinate system to the NED coordinate system and the latest rotation matrix can be obtained efficiently and accurately. In the end, the coordinate of the antenna phase center of the GNSS receiver is reduced to the position coordinate of the end portion of the pole by a geometric transformation, thereby completing the tilt measurement.

(2) The surveyor is not required to perform the task of centering the level bubble and leveling the pole, which improves the work efficiency. Moreover, without introducing the magnetic components, the tilt measurement is immune to magnetic disturbances, so the tilt measurement errors can be avoided, ensuring the accuracy of the tilt measurement and compensation.

(3) The IMU sensor can be placed anywhere inside the GNSS receiver, and the magnetic sensor may or may not be included, improving the design flexibility and reducing the production difficulty of the GNSS RTK surveying instrument, facilitating practical application and promotion.

Embodiment 2

Figure 3:
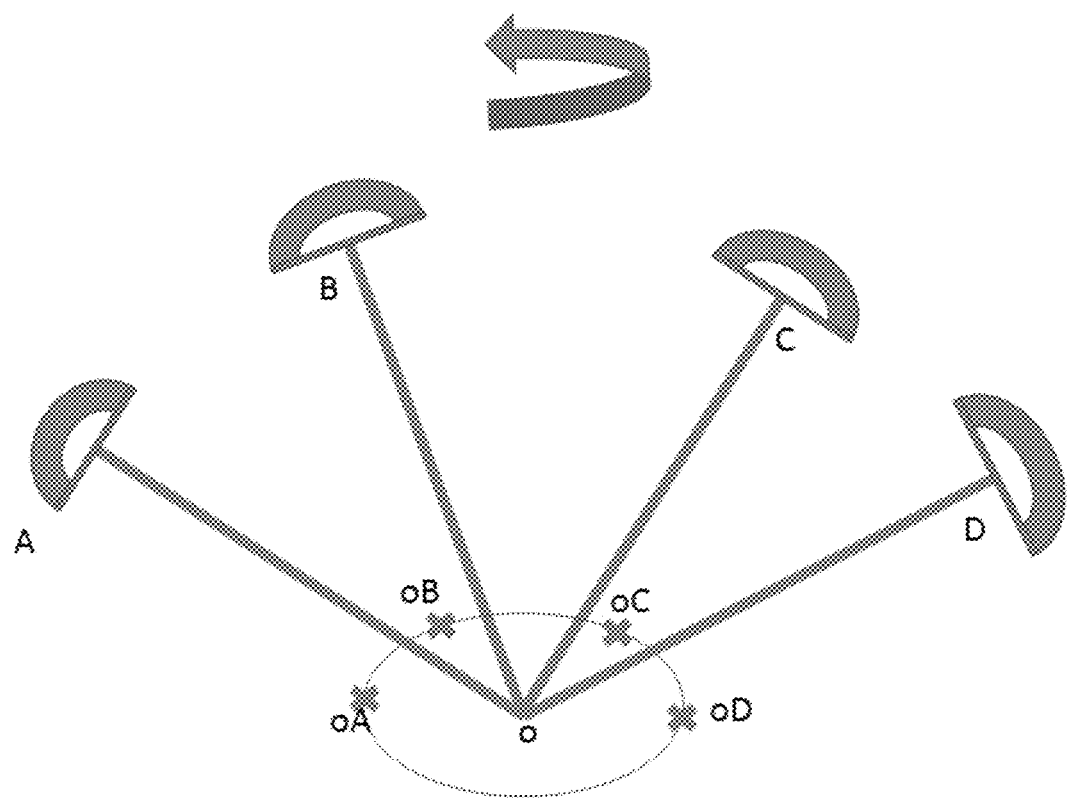
FIG. 3 is an application illustration of a GNSS RTK surveying instrument according to the present disclosure when installation angle self-calibration is performed.

As shown in FIG. 3, a further optimization based on embodiment 1 is proposed in this embodiment, i.e., a method for tilt measurement and compensation of the GNSS RTK surveying instrument, which further includes an installation angle self-calibration method described in the following steps S201-S204 after the step S102:

S201, by performing the steps S103-S108, successively acquiring S position coordinates of the bottom end of the pole corresponding to different antenna phase center positions during the movements of the pole including: $((\phi_O)_{k1} (\lambda_O)_{k1} (h_O)_{k1})^T$, $((\phi_O)_{k2} (\lambda_O)_{k2} (h_O)_{k2})^T$, ..., $((\phi_O)_{kS} (\lambda_O)_{kS} (h_O)_{kS})^T$, wherein, S is a natural number equal to or more than 2, the $S^{th}$ position coordinate of the bottom end of the pole is a latest acquired position coordinate of the bottom end of the pole.

In the step S201, since the GNSS RTK surveying instrument requires the pole to be strictly parallel to the Z-axis of the body coordinate system while the device that is not calibrated cannot meet this requirement, the present embodiment estimates the installation pitch angle and the installation roll angle, so that the angular error caused by the assembling process of the device can be avoided, and the angular error caused by the non-vertical (e.g., curved) pole can be avoided, thereby reducing the application restrictions of the device, and being appropriate for various types of poles. In addition, by shaking the pole 1, the position coordinates of the bottom end of the pole can be obtained at different antenna phase center positions, thereby ensuring the mutual independency and solvability of the subsequent equations. As shown in FIG. 3, for example, position coordinates OA, OB, OC, and OD of the bottom positions of the pole in one-to-one correspondence to different antenna phase center positions A, B, C, and D can be obtained. Moreover, assuming the point O is the true position of the bottom end of the pole.

S202, the following equation is established:

$$\begin{cases} \left( \begin{pmatrix} (\phi_O)_{k1} \\ (\lambda_O)_{k1} \\ (h_O)_{k1} \end{pmatrix} + L*(R_{xyz}^{ned})_{k1} \begin{pmatrix} \Delta p \\ -\Delta r \\ 0 \end{pmatrix} \right) - \begin{pmatrix} \phi_O \\ \lambda_O \\ h_O \end{pmatrix} = 0 \\ \left( \begin{pmatrix} (\phi_O)_{k2} \\ (\lambda_O)_{k2} \\ (h_O)_{k2} \end{pmatrix} + L*(R_{xyz}^{ned})_{k2} \begin{pmatrix} \Delta p \\ -\Delta r \\ 0 \end{pmatrix} \right) - \begin{pmatrix} \phi_O \\ \lambda_O \\ h_O \end{pmatrix} = 0 \\ \vdots \\ \left( \begin{pmatrix} (\phi_O)_{kS} \\ (\lambda_O)_{kS} \\ (h_O)_{kS} \end{pmatrix} + L*(R_{xyz}^{ned})_{kS} \begin{pmatrix} \Delta p \\ -\Delta r \\ 0 \end{pmatrix} \right) - \begin{pmatrix} \phi_O \\ \lambda_O \\ h_O \end{pmatrix} = 0 \end{cases}$$

where, $(R_{xyz}^{ned})_{k1}$, $(R_{xyz}^{ned})_{k2}$, ..., $(R_{xyz}^{ned})_{kS}$ in one-to-one correspondence to different antenna phase centers are rotation matrices obtained from the step S107, L is the length of the pole 1, $\Delta p$ is an installation pitch angle to be solved, $\Delta r$ is an installation roll angle to be solved, $\phi_O$ is a true longitude of the bottom end of the pole 1 to be solved, $\lambda_O$ is a true latitude of the bottom end of the pole 1 to be solved, and $h_O$ is a true height of the bottom end of the pole 1 to be solved.

In the step S202, since there are five objects to be solved, theoretically, only five mutually independent equations need to be established to solve the target objects. Therefore, the value of S can be at least two, and thus six mutually independent equations can be established.

S203, the foregoing equations are operated and calculated to obtain an average installation pitch angle $\Delta p$, an average installation roll angle $\Delta r$, and a true position coordinate of the bottom end of the pole: $(\phi_O \lambda_O h_O)^T$.

In the step S203, since the number of the established equations (at least 6) is larger than the number of objects to be solved (basically 5), different numerical results for the same object to be solved are obtained, and thus an averaging process is needed, so that the true coordinate of the bottom end of the pole is getting closer to the true value.

S204, if the error between the $S^{th}$ position coordinate of the bottom end of the pole and true position coordinate of the bottom end of the pole satisfies a predetermined threshold value, a prompt indicating that the self-calibration of the installation angle is completed is generated, otherwise the steps S201 to S204 are repeated.

In the step S204, the prompt indicating that the self-calibration of the installation angle is completed is used to give a prompt to the outside that the self-calibration of the installation angle is finished, and the position coordinates of the bottom end of the pole that are output afterwards are all acceptable.

This embodiment has the following advantage on the basis of the technical effects of embodiment 1: (1) Estimation can be performed based on the installation pitch angle and the installation roll angle, so that the angular error caused by the assembling process of the device can be eliminated, and the angular error caused by the non-vertical pole (e.g., curved) can be avoided, thereby reducing the application restrictions of the device, and being appropriate for various kinds of poles without requiring any type of factory calibration as self-calibration can always be done during the operation process. Compared to conventional GNSS tilt measurement and competing products, the present disclosure greatly improves the work efficiency and accuracy and eliminates unnecessary production processes.

The various embodiments described above are merely for exemplary purpose. The units described as separate components may or may not be physically separated, the components displayed as units may or may not be physical units, namely, they may be located in one place, or may be distributed on multiple network units. Some or all of the modules may be selected according to actual needs to achieve the purposes of the solutions of the above embodiments. Those of ordinary skill in the art can understand and implement without creative efforts.

With the description of the embodiments above, those skilled in the art can evidently understand that the various implementation methods can be realized by means of software plus necessary general hardware platform, or by hardware for sure. Based on such an understanding, the above technical solutions or the parts contributing to the present disclosure against the prior art can be essentially embodied in the form of software products. The computer software products may be stored in a computer readable storage medium, such as a ROM/RAM, a magnetic disk, an optical disk, etc., and includes a plurality of instructions for causing a computer device to perform the methods described in various embodiments or some parts of the embodiments.

The above embodiments are merely intended to illustrate the technical solutions of the present disclosure rather than limit the present disclosure. Although the present disclosure has been described in detail with reference to the above embodiments, it should be understood by those skilled in the art that the technical solutions described in the above embodiments may be modified, or some of the technical features may be equivalently substituted. These modifications and substitutions do not put the corresponding technical solutions in a condition departing from the spirit and scope of the technical solutions in the embodiments of the present disclosure.

Finally, it should be noted that the present disclosure is not limited to the above optional embodiments, and anyone inspired by the present invention can come up with other forms of products. The above embodiments should not be construed as limiting the scope of the present disclosure, and the scope of the present disclosure is defined by the appended claims, and the specification may be used to interpret the claims.

What is claimed is:

1. A method for tilt measurement and compensation of a GNSS RTK surveying instrument based on a GNSS receiver and an IMU sensor, characterized in that, the GNSS RTK surveying instrument (FIG. 1) comprises a pole (1), a global navigation satellite system (GNSS) receiver (2), an inertial measurement unit (IMU) sensor (3) and a microprocessor (4); the GNSS receiver (2) is provided at a pole tip, the IMU sensor is provided on the pole and comprises a three-axis accelerometer and a three-axis gyroscope, and the microprocessor is also provided on the pole and communicates with the GNSS receiver and the IMU sensor, respectively;

the method for tilt measurement and compensation of the GNSS RTK surveying instrument comprises: wirelessly receiving GNSS data by the GNSS receiver, collecting and acquiring IMU data by the IMU sensor, and obtaining a position coordinate of a bottom end of the pole by the microprocessor according to the following steps:

S101, establishing a dynamical model and an observational model of a Kalman filter:

$$\begin{cases} x_k = Fx_{k-1} + w_{k-1} \\ y_k = Hx_k + v_k \end{cases},$$

wherein, $x_k$ is a state value of an unknown state variable x at a time point k, $x_{k-1}$ is a state value of the unknown state variable x at a time point (k−1), $y_k$ is an observational value of a known observational variable y at the time point k, F is a transfer matrix, H is an observational matrix, $w_{k-1}$ is a Gaussian dynamical noise, $v_k$ is a Gaussian observational noise, and k is a positive integer; the unknown state variable x comprises the following nine variables of the IMU sensor: a longitude error dϕ, a latitude error dλ, a height error dh, an N-direction velocity deviation $dv_n$, an E-direction velocity deviation $dv_e$, a D-direction velocity deviation $dv_d$, a roll angle deviation $dρ_r$, a pitch angle deviation $dρ_p$, and a yaw angle deviation $dρ_q$, in a north-east-down (NED) coordinate system; the known observational variable y comprises the following six observational variables of the IMU sensor (3): a longitude observational error Δϕ, a latitude observational error Δλ, a height observational error Δh, an N-direction velocity observational deviation $Δv_n$, an E-direction velocity observational deviation $Δv_e$, and a D-direction velocity observational deviation $Δv_d$, in the NED coordinate system;

S102, after setting a tilt measurement mode, acquiring an initial state value $x_0$ of the unknown state variable x, and initializing the variable k to 1;

S103, after a unit of time Δτ, synchronously reading the GNSS data and the IMU data at the time point k;

S104, acquiring a coordinate of an antenna phase center of the GNSS receiver at the time point k according to the GNSS data obtained from reading, the coordinate comprises a longitude $ϕ_k^{gnss}$, a latitude $λ_k^{gnss}$, and a height $h_k^{gnss}$, in the NED coordinate system; acquiring an original three-dimensional attitude angle of the IMU sensor at the time point k according to the IMU data obtained from reading, the original three-dimensional attitude angle comprises a roll angle $(\tilde{ρ}_r)_k$, a pitch angle $(\tilde{ρ}_p)_k$ and a yaw angle $(\tilde{ρ}_q)_k$, and acquiring the observational value $y_k$ of the known observational variable y at the time point k according to the GNSS data and the IMU data obtained from reading;

S105, predicting and correcting the unknown state variable x to obtain the state value $x_k$ of the unknown state variable x at the time point k according to the dynamical model and the observational model of the Kalman filter;

S106, correcting the original three-dimensional attitude angle $((\tilde{ρ}_r)_k \ (\tilde{ρ}_p)_k \ (\tilde{ρ}_q)_k)^T$ of the IMU sensor at the time point k by a roll angle deviation $(dρ_r)_k$ at the time point k, a pitch angle deviation $(dρ_p)_k$ at the time point k, and a yaw angle deviation $(dρ_q)_k$ at the time point k in the state value $x_k$ at the time point k in an one-to-one correspondence to obtain corrected three-dimensional attitude angles at the time point k comprising: a roll angle $(ρ_r)_k$, a pitch angle $(ρ_p)_k$, and a yaw angle $(ρ_q)_k$, of the IMU sensor from an XYZ coordinate system to the NED coordinate system, wherein the XYZ coordinate system is a three-axis coordinate system of the IMU sensor;

S107, acquiring a rotation matrix $(R_{xyz}^{ned})_k$ at the time point k from the XYZ coordinate system to the NED coordinate system according to the corrected three-dimensional attitude angles at the time point k;

S108, acquiring a position coordinate of the bottom end of the pole (1) at the time point k according to the following formula:

$$\begin{pmatrix} (ϕ_O)_k \\ (λ_O)_k \\ (h_O)_k \end{pmatrix} = \begin{pmatrix} (ϕ_G)_k \\ (λ_G)_k \\ (h_G)_k \end{pmatrix} + (R_{xyz}^{ned})_k * \begin{pmatrix} 0 \\ 0 \\ L \end{pmatrix}$$

wherein, $(ϕ_O)_k$ is a longitude in the NED coordinate system, $(λ_O)_k$ is a latitude in the NED coordinate system, $(h_O)_k$ is a height in the NED coordinate system, and L is a length of the pole (1); and S109, automatically incrementing the variable k by 1, and then repeating steps S103-S109 until a value of the variable k is equal to or more than 20.

2. The method for tilt measurement and compensation of the GNSS RTK surveying instrument based on the GNSS receiver and the IMU sensor of claim 1, wherein, the transfer matrix F in the step S101 is obtained by converting and calculating according to a first position error state equation, a first velocity deviation state equation, and a first attitude deviation state equation as follows:

(1) the first position error state equation:

$$\begin{pmatrix} (dϕ)_k \\ (dλ)_k \\ (dh)_k \end{pmatrix} =$$

$$\begin{pmatrix} (dϕ)_{k-1} \\ (dλ)_{k-1} \\ (dh)_{k-1} \end{pmatrix} + \begin{pmatrix} \dfrac{1}{R_M + h_0^{gnss}} & 0 & 0 \\ 0 & \dfrac{1}{\cos(λ_0^{gnss})(R_N + h_0^{gnss})} & 0 \\ 0 & 0 & -1 \end{pmatrix} \begin{pmatrix} (dv_n)_{k-1} \\ (dv_e)_{k-1} \\ (dv_d)_{k-1} \end{pmatrix} Δτ$$

(2) the first velocity deviation state equation:

$$\begin{pmatrix} (dv_n)_k \\ (dv_e)_k \\ (dv_d)_k \end{pmatrix} = \begin{pmatrix} (dv_n)_{k-1} \\ (dv_e)_{k-1} \\ (dv_d)_{k-1} \end{pmatrix} + \begin{pmatrix} (f_d)_{k-1} & 0 & (f_e)_{k-1} \\ 0 & -(f_d)_{k-1} & -(f_n)_{k-1} \\ (f_n)_{k-1} & -(f_e)_{k-1} & 0 \end{pmatrix} \begin{pmatrix} (dρ_r)_{k-1} \\ (dρ_p)_{k-1} \\ (dρ_q)_{k-1} \end{pmatrix} Δτ$$

(3) the first attitude deviation state equation:

$$\begin{pmatrix} (dρ_r)_k \\ (dρ_p)_k \\ (dρ_q)_k \end{pmatrix} = \begin{pmatrix} (dρ_r)_{k-1} \\ (dρ_p)_{k-1} \\ (dρ_q)_{k-1} \end{pmatrix} + \begin{pmatrix} 0 & -1/R_N & 0 \\ 1/R_M & 0 & 0 \\ 0 & -\tan(λ_0^{gnss})/R_N & 0 \end{pmatrix} \begin{pmatrix} (dv_e)_{k-1} \\ (dv_n)_{k-1} \\ (dv_d)_{k-1} \end{pmatrix} Δτ$$

in the equations (1) to (3), $(dϕ)_k$, $(dλ)_k$, $(dh)_k$, $(dv_n)_k$, $(dv_e)_k$, $(dv_d)_k$, $(dρ_r)_k$, $(dρ_p)_k$ and $(dρ_q)_k$ are elements of $x_k$, respectively; $(dϕ)_{k-1}$, $(dλ)_{k-1}$, $(dh)_{k-1}$, $(dv_n)_{k-1}$, $(dv_e)_{k-1}$, $(dv_d)_{k-1}$, $(dρ_r)_{k-1}$, $(dρ_p)_{k-1}$ and $(dρ_q)_{k-1}$ are elements of $x_{k-1}$, respectively;

in the equations (1) to (3), $$R_M = \dfrac{R(1-ε^2)}{(1-ε^2\sin^2(λ_0^{gnss}))^{\frac{3}{2}}}, \quad R_N = \dfrac{R}{(1-ε^2\sin^2(λ_0^{gnss}))^{\frac{1}{2}}},$$

R is a radius of the earth, ε is an eccentricity of the earth, $\lambda_0^{gnss}$ a latitude of the antenna phase center obtained from the GNSS data at an initial time, $h_0^{gnss}$ is a height of the antenna phase center obtained from the GNSS data at the initial time, $(f_n)_{k-1}$ is a projection of an acceleration vector in an N-axis and the acceleration vector is obtained from the IMU data at a time point (k−1), $(f_e)_{k-1}$ is a projection of the acceleration vector in an E-axis and the acceleration vector is obtained from the IMU data at the time point (k−1), and $(f_d)_{k-1}$ is a projection of the acceleration vector in a D-axis and the acceleration vector is obtained from the IMU data at the time point (k−1).

3. The method for tilt measurement and compensation of the GNSS RTK surveying instrument based on the GNSS receiver and the IMU sensor of claim 1, wherein, in the step S101, the unknown state variable x further comprises the following six variables of the IMU sensor: an X-axis bias $da_x$ of the three-axis accelerometer, a Y-axis bias $da_y$ of the three-axis accelerometer, a Z-axis bias $da_z$ of the three-axis accelerometer, an X-axis bias $dg_x$ of the three-axis gyroscope, a Y-axis bias $dg_y$ of the three-axis gyroscope, a Z-axis bias $dg_z$ of the three-axis gyroscope, and in the step S102, initial state values of the six variables are respectively initialized to 0.

4. The method for tilt measurement and compensation of the GNSS RTK surveying instrument based on the GNSS receiver and the IMU sensor of claim 3, wherein, the transfer matrix F in the step S101 is obtained by converting and calculating according to a second position error state equation, a second velocity deviation state equation, a second attitude deviation state equation, a first-order Markov model of an accelerometer bias, and a first-order Markov model of a gyroscope bias:

(4) the second position error state equation:

$$\begin{pmatrix}(d\phi)_k\\(d\lambda)_k\\(dh)_k\end{pmatrix}=\begin{pmatrix}(d\phi)_{k-1}\\(d\lambda)_{k-1}\\(dh)_{k-1}\end{pmatrix}+\begin{pmatrix}\frac{1}{R_M+h_0^{gnss}}&0&0\\0&\frac{1}{\cos(\lambda_0^{gnss})(R_N+h_0^{gnss})}&0\\0&0&-1\end{pmatrix}\begin{pmatrix}(dv_n)_{k-1}\\(dv_e)_{k-1}\\(dv_d)_{k-1}\end{pmatrix}\Delta\tau$$

(5) the second velocity deviation state equation $$\begin{pmatrix}(dv_n)_k\\(dv_e)_k\\(dv_d)_k\end{pmatrix}=\begin{pmatrix}(dv_n)_{k-1}\\(dv_e)_{k-1}\\(dv_d)_{k-1}\end{pmatrix}+$$

$$\left[\begin{pmatrix}(f_d)_{k-1}&0&(f_e)_{k-1}\\0&-(f_d)_{k-1}&-(f_n)_{k-1}\\(f_n)_{k-1}&-(f_e)_{k-1}&0\end{pmatrix}\begin{pmatrix}(d\rho_r)_{k-1}\\(d\rho_p)_{k-1}\\(d\rho_q)_{k-1}\end{pmatrix}+(R_{xyz}^{ned})_k\begin{pmatrix}(da_y)_{k-1}\\(da_x)_{k-1}\\(da_z)_{k-1}\end{pmatrix}\right]\Delta\tau$$

(6) the second attitude deviation state equation:

$$\begin{pmatrix}(d\rho_p)_k\\(d\rho_r)_k\\(d\rho_q)_k\end{pmatrix}=\begin{pmatrix}(d\rho_p)_{k-1}\\(d\rho_r)_{k-1}\\(d\rho_q)_{k-1}\end{pmatrix}+$$

$$\left[\begin{pmatrix}1/R_M&0&0\\0&-1/R_N&0\\0&-\tan(\lambda_0^{gnss})/R_N&0\end{pmatrix}\begin{pmatrix}(dv_n)_{k-1}\\(dv_e)_{k-1}\\(dv_d)_{k-1}\end{pmatrix}+(R_{xyz}^{ned})_k\begin{pmatrix}(dg_y)_{k-1}\\(dg_x)_{k-1}\\(dg_z)_{k-1}\end{pmatrix}\right]\Delta t$$

(7) the first-order Markov model of the accelerometer bias $$\begin{pmatrix}(da_y)_k\\(da_x)_k\\(da_z)_k\end{pmatrix}=$$

$$\begin{pmatrix}(da_y)_{k-1}\\(da_x)_{k-1}\\(da_z)_{k-1}\end{pmatrix}+\left[\begin{pmatrix}-\alpha_g&0&0\\0&-\alpha_g&0\\0&0&-a_g\end{pmatrix}\begin{pmatrix}(da_y)_{k-1}\\(da_x)_{k-1}\\(da_z)_{k-1}\end{pmatrix}+\begin{pmatrix}\sqrt{2\alpha_a\sigma_a^2}\,\varepsilon_{ay}\\\sqrt{2\alpha_a\sigma_a^2}\,\varepsilon_{ax}\\\sqrt{2\alpha_a\sigma_a^2}\,\varepsilon_{az}\end{pmatrix}\right]\Delta\tau$$

(8) the first-order Markov model of the gyroscope bias:

$$\begin{pmatrix}(dg_y)_k\\(dg_x)_k\\(dg_z)_k\end{pmatrix}=$$

$$\begin{pmatrix}(dg_y)_{k-1}\\(dg_x)_{k-1}\\(dg_z)_{k-1}\end{pmatrix}+\left[\begin{pmatrix}-\alpha_g&0&0\\0&-\alpha_g&0\\0&0&-a_g\end{pmatrix}\begin{pmatrix}(dg_y)_k\\(dg_x)_k\\(dg_z)_k\end{pmatrix}+\begin{pmatrix}\sqrt{2\alpha_a\sigma_a^2}\,\varepsilon_{ay}\\\sqrt{2\alpha_a\sigma_a^2}\,\varepsilon_{ax}\\\sqrt{2\alpha_a\sigma_a^2}\,\varepsilon_{az}\end{pmatrix}\right]\Delta\tau$$

in the equations (4)-(6) and the models (7)-(8), $(d\phi)_k$, $(d\lambda)_k$, $(dh)_k$, $(dv_n)_k$, $(dv_e)_k$, $(dv_d)_k$, $(d\rho_r)_k$, $(d\rho_p)_k$, $(d\rho_q)_k$, $(da_x)_k$, $(da_y)_k$, $(da_z)_k$, $(dg_x)_k$, $(dg_y)_k$ and $(dg_z)_k$ are elements of $x_k$, respectively; $(d\phi)_{k-1}$, $(d\lambda)_{k-1}$, $(dh)_{k-1}$, $(dv_n)_{k-1}$, $(dv_e)_{k-1}$, $(dv_d)_{k-1}$, $(d\rho_r)_{k-1}$, $(d\rho_p)_{k-1}$, $(d\rho_q)_{k-1}$, $(da_x)_{k-1}$, $(da_y)_{k-1}$, $(da_z)_{k-1}$, $(dg_x)_{k-1}$, $(dg_y)_{k-1}$ and $(dg_z)_{k-1}$ are elements of $x_{k-1}$, respectively;

in the equations (4)-(6) and the models (7)-(8), $$(R_{xyz}^{ned})_k=(R_{xyz}^{ned})_{k-1}+(R_{xyz}^{ned})_{k-1}(\Omega_{ib}^{xyz}-\Omega_{in}^{xyz})\Delta t,$$

$$\Omega_{ib}^{xyz}=\begin{pmatrix}0&-(w_z)_k&(w_y)_k\\(w_z)_k&0&-(w_x)_k\\-(w_y)_k&(w_x)_k&0\end{pmatrix},$$

$$\Omega_{in}^{xyz}=\begin{pmatrix}0&-w_{in,z}^b&w_{in,y}^b\\w_{in,z}^b&0&-w_{in,x}^b\\-w_{in,y}^b&w_{in,x}^b&0\end{pmatrix},$$

$$w_{in}^b=\begin{pmatrix}w_{in,x}^b\\w_{in,y}^b\\w_{in,z}^b\end{pmatrix}=(R_{xyz}^{ned})_{k-1}^{-1}\begin{pmatrix}\frac{-(dv_n)_{k-1}}{R_M+h_0^{gnss}}\\\frac{(dv_e)_{k-1}}{R_N+h_0^{gnss}}\\\frac{(dv_e)_{k-1}\tan(\lambda_0^{gnss})}{R_N+h_0^{gnss}}\end{pmatrix},$$

$$R_M=\frac{R(1-\varepsilon^2)}{(1-\varepsilon^2\sin^2(\lambda_0^{gnss}))^{\frac{3}{2}}},$$

-continued $$R_N = \frac{R}{(1-\varepsilon^2\sin^2(\lambda_0^{gnss}))^{\frac{1}{2}}},$$

R is the radius of the earth, $\varepsilon$ is the eccentricity of the earth, $\lambda_0^{gnss}$ is a latitude of the antenna phase center obtained from the GNSS data at the initial time, $h_0^{gnss}$ is a height of the antenna phase center obtained from the GNSS data at the initial time, $(f_n)_{k-1}$ is a projection of an acceleration vector in an N-axis and the acceleration vector is obtained from the IMU data at a time point (k−1), $(f_e)_{k-1}$ is a projection of the acceleration vector in an E-axis and the acceleration vector is obtained from the IMU data at the time point (k−1), $(f_d)_{k-1}$ is a projection of the acceleration vector in a D-axis and the acceleration vector is obtained from the IMU data at the time point (k−1), $\alpha_a$ is a bias constant of the three-axis accelerometer, $\sigma_a^2$ is a bias variance of the three-axis accelerometer, $\varepsilon_{ax}$ is an X-axis white noise driving a bias of the three-axis accelerometer, $\varepsilon_{ay}$ is a Y-axis white noise driving the bias of the three-axis accelerometer, $\varepsilon_{az}$ is a Z-axis white noise driving the bias of the three-axis accelerometer, $\alpha_g$ is a bias constant of the three-axis gyroscope, $\sigma_g^2$ is a bias variance of the three-axis gyroscope, $\varepsilon_{gx}$ is an X-axis white noise driving a bias of the three-axis gyroscope, $\varepsilon_{gy}$ is a Y-axis white noise driving the bias of the three-axis gyroscope, $\varepsilon_{gz}$ is a Z-axis white noise driving the bias of the three-axis gyroscope, $(w_x)_k$ is an X-axis angular velocity obtained from the IMU data at the time point k, $(w_y)_k$ is a Y-axis angular velocity obtained from the IMU data at the time point k, and $(w_z)_k$ is a Z-axis angular velocity obtained from the IMU data at the time point k.

5. The method for tilt measurement and compensation of the GNSS RTK surveying instrument based on the GNSS receiver and the IMU sensor of claim 1, wherein, in the step S102, the initial state value $x_0$ of the unknown state variable x is obtained according to a method comprising:

initializing a longitude error $(d\phi)_0$, a latitude error $(d\lambda)_0$, a height error $(dh)_0$, an N-direction velocity deviation $(dv_n)_0$, an E-direction velocity deviation $(dv_e)_0$, and a D-direction velocity deviation $(dv_d)_0$ in the initial state value $x_0$ to 0, respectively;

initializing a roll angle deviation $(d\rho_r)_0$, a pitch angle deviation $(d\rho_p)_0$, and a yaw angle deviation $(d\rho_q)_0$ of the initial state value $x_0$ to the following:

$$\begin{cases} (d\rho_r)_0 = \sin^{-1}((f_x)_0/g) \\ (d\rho_p)_0 = \sin^{-1}((f_y)_0/g) \\ (d\rho_q)_0 = \tan^{-1}((v_n)_0/(v_e)_0) \end{cases},$$

wherein, $(f_x)_0$ is an X-axis acceleration obtained from the IMU data at the initial time point, $(f_y)_0$ is a Y-axis acceleration obtained from the IMU data at the initial time point, g is a gravity acceleration at a survey location, $(v_n)_0$ is an N-axis velocity obtained from the GNSS data at the initial time point, and $(v_e)_0$ is an E-axis velocity obtained from the GNSS data at the initial time point.

6. The method for tilt measurement and compensation of the GNSS RTK surveying instrument based on the GNSS receiver and the IMU sensor of claim 5, wherein, the gravity acceleration g of a survey location is calculated according to the following formula:

$$g = \chi_1(1+\chi_2(\sin\lambda_0^{gnss})^2 + \chi_3(\sin\lambda_0^{gnss})^4) + (\chi_4+\chi_5(\sin\lambda_0^{gnss})^2)h_0^{gnss} + \lambda_6(h_0^{gnss})^2$$

wherein, $\lambda_0^{gnss}$ a latitude of the antenna phase center obtained from the GNSS data at an initial time, $h_0^{gnss}$ is a height of the antenna phase center obtained from the GNSS data at the initial time, and $\chi_1$, $\chi_2$, $_3$, $\chi_4$, $\chi_5$ and $\chi_6$ are well-known parameters for calculating the gravitational acceleration g, respectively.

7. The method for tilt measurement and compensation of the GNSS RTK surveying instrument based on the GNSS receiver and the IMU sensor of claim 1, before the step S103, further comprising a data synchronization method, wherein the data synchronization method comprises:

S300, performing a time synchronization of the IMU data by applying a one-pulse-per-second (1PPS) signal and a national marine electronics association global position system fix data (NMEA GPGGA) wirelessly acquired by the GNSS receiver (3).

8. The method for tilt measurement and compensation of the GNSS RTK surveying instrument based on the GNSS receiver and the IMU sensor of claim 1, wherein, in the step S104, the observational value $y_k$ of the known observational variable y at the time point k is obtained by the following equation set:

$$\begin{cases} \begin{pmatrix} (\Delta\phi)_k \\ (\Delta\lambda)_k \\ (\Delta h)_k \end{pmatrix} = \begin{pmatrix} \phi_k^{imu} \\ \lambda_k^{imu} \\ h_k^{imu} \end{pmatrix} - \begin{pmatrix} \phi_k^{gnss} \\ \lambda_k^{gnss} \\ h_k^{gnss} \end{pmatrix} = \begin{pmatrix} \frac{1}{R_M + h_0^{gnss}} & 0 & 0 \\ 0 & \frac{1}{\cos(\lambda_0^{gnss})(R_N + h_0^{gnss})} & 0 \\ 0 & 0 & -1 \end{pmatrix} (R_{xyz}^{ned})_k D_{imu}^{gnss} \\ \begin{pmatrix} (\Delta v_n)_k \\ (\Delta v_e)_k \\ (\Delta v_d)_k \end{pmatrix} = \begin{pmatrix} (v_n^{imu})_k \\ (v_e^{imu})_k \\ (v_d^{imu})_k \end{pmatrix} - \begin{pmatrix} (v_n^{gnss})_k \\ (v_e^{gnss})_k \\ (v_d^{gnss})_k \end{pmatrix} = -(R_{xyz}^{ned})_k((w_{ib}^b - w_{in}^b)D_{imu}^{gnss}) \end{cases},$$

wherein, $(\Delta\phi)_k$, $(\Delta\lambda)_k$, $(\Delta h)_k$, $(\Delta v_n)_k$, $(\Delta v_e)_k$ and $(\Delta v_d)_k$ are elements of $y_k$, respectively, $\phi_k^{imu}$ is the longitude of the IMU sensor at the time point k, $\lambda_k^{imu}$ is the latitude of the IMU sensor at the time point k, $h_k^{imu}$ is the height of the IMU sensor at the time point k, $(v_n^{imu})_k$ is an N-direction velocity of the IMU sensor at the time point k, $(v_e^{imu})_k$ is an E-direction velocity of the IMU sensor at the time point k, $(v_d^{imu})_k$ is a D-direction velocity of the IMU sensor at the time point k, $(v_n^{gnss})_k$ is an N-direction velocity of the antenna phase center of the GNSS receiver at the time point k, $(v_e^{gnss})_k$ is an E-direction velocity of the antenna phase center of the GNSS receiver at the time point k, and $(v_d^{gnss})_k$ is a D-direction velocity of the antenna phase center of the GNSS receiver at the time point k;

wherein, $$(R_{xyz}^{ned})_k = (R_{xyz}^{ned})_{k-1} + (R_{xyz}^{ned})_{k-1}(\Omega_{ib}^{xyz} - \Omega_{in}^{xyz})\Delta\tau,$$

$$\Omega_{ib}^{xyz} = \begin{pmatrix} 0 & -(w_z)_k & (w_y)_k \\ (w_z)_k & 0 & -(w_x)_k \\ -(w_y)_k & (w_x)_k & 0 \end{pmatrix},$$

$$\Omega_{in}^{xyz} = \begin{pmatrix} 0 & -w_{in,z}^b & w_{in,y}^b \\ w_{in,z}^b & 0 & -w_{in,x}^b \\ -w_{in,y}^b & w_{in,x}^b & 0 \end{pmatrix},$$

$$w_{in}^b = \begin{pmatrix} w_{in,x}^b \\ w_{in,y}^b \\ w_{in,z}^b \end{pmatrix} = (R_{xyz}^{ned})_{k-1}^{-1} \begin{pmatrix} \frac{-(\Delta v_n)_{k-1}}{R_M + h_0^{gnss}} \\ \frac{(\Delta v_e)_{k-1}}{R_N + h_0^{gnss}} \\ \frac{(\Delta v_e)_{k-1}\tan(\lambda_0^{gnss})}{R_N + h_0^{gnss}} \end{pmatrix},$$

$$w_{ib}^b = \begin{pmatrix} (w_x)_k \\ (w_y)_k \\ (w_z)_k \end{pmatrix},$$

$$R_M = \frac{R(1-\varepsilon^2)}{(1-\varepsilon^2\sin^2(\lambda_0^{gnss}))^{\frac{3}{2}}},$$

$$R_N = \frac{R}{(1-\varepsilon^2\sin^2(\lambda_0^{gnss}))^{\frac{1}{2}}},$$

R is the radius of the earth, $\varepsilon$ is the eccentricity of the earth, $\lambda_0^{gnss}$ is a latitude of the antenna phase center obtained from the GNSS data at the initial time point, $h_0^{gnss}$ is a height of the antenna phase center obtained from the GNSS data at the initial time point, $(w_x)_k$ is an X-axis angular velocity obtained from the IMU data at the time point k, $(w_y)_k$ is a Y-axis angular velocity obtained from the IMU data at the time point k, and $(w_z)_k$ is a Z-axis angular velocity obtained from the IMU data at the time point k, $(\Delta v_n)_k$ and $(\Delta v_e)_{k-1}$ are elements of $y_k$, respectively, and $D_{imu}^{gnss}$ is a three-dimensional vector from an origin of the XYZ coordinate system to the antenna phase center of the GNSS receiver.

9. The method for tilt measurement and compensation of the GNSS RTK surveying instrument based on the GNSS receiver and the IMU sensor of claim 1, wherein, in the step S107, the rotation matrix $(R_{xyz}^{ned})_k$ at the time point k is obtained according to the following formula:

10. The method for tilt measurement and compensation of the GNSS RTK surveying instrument based on the GNSS receiver and the IMU sensor of claim 1, after the step S102, further comprising a self-calibration method of an installation angle, wherein the self-calibration method comprises the following steps S201-S204:

S201, by performing the steps S103-S108, successively acquiring S position coordinates of the bottom end of the pole corresponding to different antenna phase center positions during the movements of the pole, the S position coordinates comprise: $((\phi_O)_{k1} (\lambda_O)_{k1} (h_O)_{k1})^T$, $((\phi_O)_{k2} (\lambda_O)_{k2} (h_O)_{k2})^T$, ..., $((\phi_O)_{kS} (\lambda_O)_{kS} (h_O)_{kS})^T$, wherein S is a natural number equal to or more than 2, the $S^{th}$ position coordinate of the bottom end of the pole is a latest acquired position coordinate of the bottom end of the pole;

S202, establishing the following equation set:

$$\begin{cases} \begin{pmatrix} (\phi_O)_{k1} \\ (\lambda_O)_{k1} \\ (h_O)_{k1} \end{pmatrix} + L*(R_{xyz}^{ned})_{k1}\begin{pmatrix} \Delta p \\ -\Delta r \\ 0 \end{pmatrix} - \begin{pmatrix} \phi_O \\ \lambda_O \\ h_O \end{pmatrix} = 0 \\ \begin{pmatrix} (\phi_O)_{k2} \\ (\lambda_O)_{k2} \\ (h_O)_{k2} \end{pmatrix} + L*(R_{xyz}^{ned})_{k2}\begin{pmatrix} \Delta p \\ -\Delta r \\ 0 \end{pmatrix} - \begin{pmatrix} \phi_O \\ \lambda_O \\ h_O \end{pmatrix} = 0, \\ \vdots \\ \begin{pmatrix} (\phi_O)_{kS} \\ (\lambda_O)_{kS} \\ (h_O)_{kS} \end{pmatrix} + L*(R_{xyz}^{ned})_{kS}\begin{pmatrix} \Delta p \\ -\Delta r \\ 0 \end{pmatrix} - \begin{pmatrix} \phi_O \\ \lambda_O \\ h_O \end{pmatrix} = 0, \end{cases}$$

wherein, $(R_{xyz}^{ned})_{k1}$, $(R_{xyz}^{ned})_{k2}$, ..., $(R_{xyz}^{ned})_{kS}$ are rotation matrices obtained by performing the step S107 with an one-to-one correspondence to different antenna phase centers, respectively, L is the length of the pole, $\Delta p$ is an installation pitch angle to be solved, $\Delta r$ is an installation roll angle to be solved, $\phi_O$ is a true longitude of a position of the bottom end of the pole to be solved, $\lambda_O$ is a true latitude of the position of the bottom end position of the pole to be solved, and $h_O$ is a true height of the position of the bottom end position of the pole to be solved;

S203, operating and solving the foregoing equations to obtain an average installation pitch angle $\Delta p$, an average installation roll angle $\Delta r$, and a true position coordinate of the bottom end of the pole: $(\phi_O \lambda_O h_O)^T$; and S204, if an error between the $S^{th}$ position coordinate of the bottom end of the pole and the true position coordinate of the bottom end of the pole satisfies a predetermined threshold, then generating a prompt indicating that the self-calibration of the installation angle is completed, otherwise repeating the steps S201 to S204.

\* \* \* \* \*

$$(R_{xyz}^{ned})_k = \begin{pmatrix} \cos((\rho_q)_k)\cos((\rho_r)_k) + \sin((\rho_q)_k)\sin((\rho_p)_k)*\sin((\rho_r)_k) & \sin((\rho_q)_k)\cos((\rho_p)_k) & \cos((\rho_q)_k)\sin((\rho_r)_k) - \sin((\rho_q)_k)\sin((\rho_p)_k)\cos((\rho_r)_k) \\ -\sin((\rho_q)_k)\cos((\rho_r)_k) + \cos((\rho_q)_k)\sin((\rho_p)_k)\sin((\rho_r)_k) & \cos((\rho_q)_k)\cos((\rho_p)_k) & -\sin((\rho_q)_k)\sin((\rho_r)_k) - \cos((\rho_q)_k)\sin((\rho_p)_k)\cos((\rho_r)_k) \\ -\cos((\rho_p)_k)\sin((\rho_r)_k) & \sin((\rho_p)_k) & \cos((\rho_p)_k)\cos((\rho_r)_k) \end{pmatrix}^{-1}.$$